United States Patent
Asada et al.

(10) Patent No.: US 8,659,985 B2
(45) Date of Patent: Feb. 25, 2014

(54) OPTICAL PICKUP AND OPTICAL READ/WRITE DRIVE

(75) Inventors: Jun-ichi Asada, Hyogo (JP); Kazuo Momoo, Osaka (JP); Yohichi Saitoh, Kyoto (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 13/398,934

(22) Filed: Feb. 17, 2012

(65) Prior Publication Data

US 2013/0051205 A1    Feb. 28, 2013

(30) Foreign Application Priority Data

Aug. 31, 2011  (JP) ................................. 2011-188430

(51) Int. Cl.
G11B 7/1353    (2012.01)
G11B 7/1263    (2012.01)

(52) U.S. Cl.
USPC .............. 369/112.04; 369/44.23; 369/112.05; 369/110.03; 369/112.12; 359/563

(58) Field of Classification Search
None
See application file for complete search history.

(56) References Cited

U.S. PATENT DOCUMENTS

| | | | |
|---|---|---|---|
| 4,935,913 A | | 6/1990 | Shinoda |
| 5,224,082 A | * | 6/1993 | Kurokawa et al. ......... 369/44.23 |
| 5,365,535 A | | 11/1994 | Yamaguchi et al. |
| 5,835,471 A | | 11/1998 | Miyamoto et al. |
| 5,909,418 A | | 6/1999 | Noda et al. |
| 2012/0051205 A1 | * | 3/2012 | Hiruma et al. ............ 369/112.03 |

FOREIGN PATENT DOCUMENTS

| | | |
|---|---|---|
| JP | 59-113509 A | 6/1984 |
| JP | 63-249941 A | 10/1988 |
| JP | 07-114732 A | 5/1995 |
| JP | 08-063749 A | 3/1996 |
| JP | 11-039686 A | 2/1999 |
| JP | 11-353676 A | 12/1999 |
| JP | 11-353728 A | 12/1999 |
| JP | 2002-260251 A | 9/2002 |
| JP | 2006-209885 A | 8/2006 |

OTHER PUBLICATIONS

Form PCT/ISA/237 for corresponding International Application No. PCT/JP2012/000773 dated May 15, 2012 (with partial English translation).

* cited by examiner

*Primary Examiner* — Wayne Young
*Assistant Examiner* — Dionne Pendleton
(74) *Attorney, Agent, or Firm* — Renner, Otto, Boisselle & Sklar, LLP

(57) ABSTRACT

In one embodiment of the present invention, an optical pickup for writing and reading data on an optical storage medium comprises a diffractive element for diffracting a light beam to split it into multiple light beams. The diffracted light beams includes a zero-order diffracted light beam for writing data on a track of the land or the groove of the optical storage medium and non-zero-order diffracted light beams for reading the data from the track. The diffractive element has first and second diffraction gratings that have mutually different grating vector directions and pitches. The first diffraction grating forms light beam spots on the same track by the non-zero-order and zero-order diffracted light beams. The second diffraction grating forms a light beam spot to extend to both sides of said track, or forms a light beam spot on one side of said track, by the non-zero-order diffracted light beams.

12 Claims, 20 Drawing Sheets

FIG.4
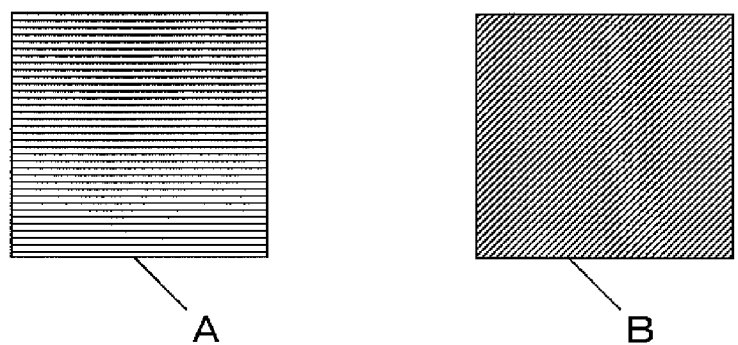
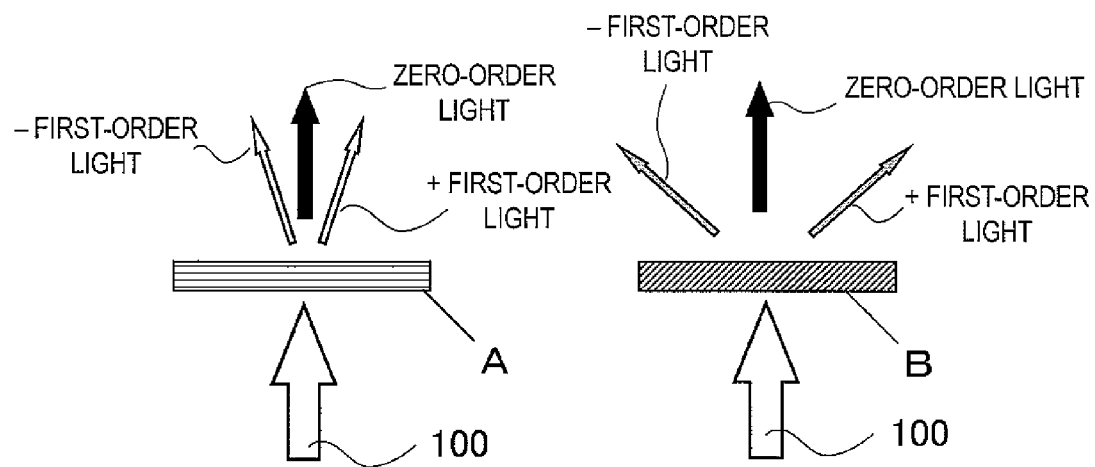

OPTICAL PICKUP AND OPTICAL READ/WRITE DRIVE

BACKGROUND OF THE INVENTION

1. Field of the Invention

The present invention relates to an optical pickup and optical read/write drive that writes data on an optical storage medium and that reads data that is stored on an optical storage medium. More particularly, the present invention relates to an apparatus that carries out verification on data being written on an optical storage medium while performing the write operation. Examples of optical storage media that can be used in the present invention include optical tapes, optical discs and optical cards.

2. Description of the Related Art

Recently, the size of digital data that can be stored on a storage medium has been rising steeply year by year as the resolutions of video data and still picture data have been tremendously increased and as increasing numbers of paper media have been converted into electronic ones. Meanwhile, so-called "crowd computing" technologies that allow people to use various kinds of applications and services via servers and storage systems on some network have become more and more popular nowadays. According to such crowd computing technologies, as a huge number of users save various kinds of data on that storage system on the network, the amount of data accumulated should keep on skyrocketing from now on.

In the meantime, as regulations have been established one after another with regard to the duty of preserving such a huge amount of data saved, it should also be increasingly important to devise a method for saving that enormous amount of data as securely and as reliably as possible.

An apparatus that writes data of such a huge size on an optical storage medium must perform the operation of seeing if the data has been written just as intended on the optical storage medium in order to increase the reliability of writing. Such an operation will be referred to herein as a "verify operation". In this description, an "optical storage medium" will refer to a medium on which a mark can be recorded optically when irradiated with a light beam. And the light beam is radiated from an "optical pickup" that includes a light source and a lens that focuses the light beam emitted from the light source onto the medium. When the optical pickup irradiates an optical storage medium with a light beam, an irradiated portion of the optical storage medium comes to have a different optical property (such as a refractive index) from the other non-irradiated portion of the medium. Such an irradiated portion, of which the optical property has varied, will be referred to herein as a "recorded mark".

In optical disc technologies, data can be read out from an optical storage medium by irradiating the storage medium with a relatively weak light beam with a constant intensity and detecting the light that has been modulated by, and reflected from, the optical storage medium. On a rewritable optical storage medium, a recording material film, from/on which data can be read and written optically, is deposited by evaporation process, for example, on the surface of a base (which may be either a disc or a long film) on which grooves and lands are arranged. In writing data on a rewritable optical storage medium, data is written there by irradiating the optical storage medium with a pulsed light beam, of which the optical power has been changed according to the data to be written, and locally changing the property of the recording material film.

In a recordable or rewritable optical storage medium, when data is going to be written on its recording material film, the recording material film is irradiated with such a light beam, of which the optical power has been modulated as described above, thereby recording an amorphous mark on a crystalline recording material film. Such an amorphous recorded mark is formed there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on an optical storage medium, the light beam always needs to maintain a predetermined converging state on a target track. For that purpose, a "focus control" and a "tracking control" need to be done. The "focus control" means controlling the position of an objective lens along a normal to the disc surface so that the focal point (or at least the converging point) of the light beam is always located on the target track. On the other hand, the "tracking control" means controlling the position of the objective lens parallel to the surface of the optical storage medium and perpendicularly to the track so that the light beam spot is always located right on the target track.

In order to perform such a focus control or a tracking control, the focus error or the tracking error needs to be detected based on the light that has been reflected from the optical storage medium and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical disc.

A conventional apparatus that performs a read/write operation on a write-once or rewritable storage medium such as an optical disc reads data that has been just written and compares the data written to other data stored there in order to detect an error, if any, lest the write operation should fail due to a defect on the storage medium.

Such a verify operation is often performed in a unit at which a constant write or transfer rate can be maintained, not every time a write operation has been finished. That is to say, every time the disc has turned to a predetermined degree, the write operation is suspended, a track jump is made to return to the previous location, that portion on which data has just been written is scanned to detect any error, and then a track jump is made once again to move to a different area and write the next data there. And this series of operations is carried out over and over again. That is why although reliability can be certainly ensured in this way for the data that has been written, it takes a longer time to get the write operation done.

If any error is detected when the data that has just been written is read, then the write operation is retried on another area, not the area on which the write error has occurred. On an optical disc, a set of data and its ID information are stored on the basis of a unit area called a "sector". Thus, the data that has been written with an error on a sector is rewritten on another sector (which will be referred to herein as a "replacement sector").

A conventional read/write drive that makes such data correction is disclosed in Japanese Patent Application Laid-Open Publication No. 59-113509 (which will be referred to herein as "Patent Document No. 1" for convenience sake), for example.

Lately, as candidate read/write drives that can save and archive data for a long time in order to meet the rising demand for storing a huge size of data with as high reliability as possible, proposed are an apparatus that uses a so-called "optical tape", which is a kind of an optical storage medium in a tape shape, and an apparatus that handles a combination of multiple optical disc drives at the same time.

Such a read/write drive to process a huge size of data should not only write and transfer data at sufficiently high rates but also keep the reliability of the written data as high as possible.

Nevertheless, for a storage medium with a low degree of random accessibility such as the tape medium, it is difficult to increase the write rate as long as such a method of writing data and checking the data just written time-sequentially over and over again is adopted as in the conventional optical disc drive.

Thus, to meet such a demand, a so-called "DRAW (direct read after write) technique for performing a write operation and a read operation for verification purposes at the same time has been proposed.

A read/write drive that adopts such a DRAW technique is disclosed in Japanese Patent Application Laid-Open Publication No. 63-249941 (which will be referred to herein as "Patent Document No. 2" for convenience sake), for example.

FIG. 17 illustrates an exemplary arrangement for an optical pickup as disclosed in Patent Document No. 2.

As shown in FIG. 17, the optical system of this optical pickup includes a light source 110, a diffraction grating 111, a detector lens 102, a beam splitter 103, a quarter-wave plate 104, a condenser lens 105, an objective lens 107 and a photodetector 101. The light emitted from the light source 110 gets diffracted by the diffraction grating 111 and split mainly into a zero-order diffracted light beam and ±first-order diffracted light beams. In FIG. 17, the ±first-order diffracted light beams that have left the diffraction grating 111 are schematically indicated by the two arrows. All of the zero-order diffracted light beam and ±first-order diffracted light beams are reflected by the beam splitter 103, transmitted through the quarter-wave plate 104 and the condenser lens 105, and then reflected by a mirror 106. In FIG. 17, only the optical path of the zero-order diffracted light beam is shown for the sake of simplicity. The light beams that have been reflected by the mirror 106 then enter the objective lens 107. Finally, the zero-order diffracted light beam and the ±first-order diffracted light beams are condensed by the condenser lens 107, thereby forming three condensed beam spots (that are a main spot and two sub-spots) on the same track on the optical storage medium 108.

In this description, the zero-order diffracted light beam will be referred to herein as a "main beam" and the ±first-order diffracted light beams as "sub-beams", respectively.

FIGS. 18(a) and 18(b) are respectively a plan view and a cross-sectional view illustrating the arrangement of light beam spots that are formed by the condensed main and sub-beams on the optical disc 108, which has lands 200 and grooves 210.

In the example illustrated in FIG. 18, the main beam spot formed by the zero-order light beam is a write beam spot, which is used to write a signal on the optical disc 108. On the other hand, the two sub-beam spots formed by the ±first-order light beams are read beam spots, which are used to scan a recorded track. The diffraction grating 111 is designed so that the diffraction efficiency of the ±first-order light beams becomes lower than that of the zero-order light beam. That is why the intensities of the ±first-order light beams are so much lower than that of the zero-order light beam that data that has been written with the zero-order light beam is never erased or altered even when irradiated with the ±first-order light beams.

The main beam spot formed by the zero-order light beam and the two sub-beam spots formed by the ±first-order light beams are located on the same track. In the example illustrated in FIG. 18, as the optical disc 108 turns, the beam spot moves on the land 200 of the optical disc 108 in the direction indicated by the arrow a. More specifically, one of the two sub-beam spots, which is formed by the +first-order light beam, moves behind the main beam spot formed by the zero-order light beam and reads the recorded mark. Meanwhile, the other sub-beam spot formed by the −first-order light beam moves ahead of the main beam spot formed by the zero-order light beam, and its reflected light includes no information about the recorded mark.

These light beams are reflected from the optical disc 108, transmitted through the optical system, and then incident on a photodetector 101, which detects the reflected light of the main and sub-beam spots.

FIG. 19 illustrates the arrangement of photoelectric transducers (photodiodes) in the photodetector 101.

The quadruple photodiode 121 shown in FIG. 19 receives the zero-order light beam (i.e., the reflected light of the main beam spot). The magnitude of astigmatism produced by the detector lens 102 shown in FIG. 17 changes with the degree of defocusing. That is why the photodiode 121 detects not only the focus signal but also the tracking error signal by push-pull method as well.

On the other hand, the photodiodes 122 and 123 receive reflected light of the sub-beam spots 1 and 2, respectively.

The light source 110 emits a light beam that has been driven with a modulation signal in order to record a mark on the optical disc 108. The intensity of the light beam is modulated so as to include either only one pulse or a series of multiple pulses so that a number of marks with various lengths are recorded on the disc 108.

Naturally, the read beams that have been emitted from the same light source 110 have also gone through that modulation. That is why the reflected light of the sub-beam spot that moves behind the main beam spot has a signal component, to which a variation in reflectance caused by a recorded mark and a variation in the quantity of light due to the modulation of light have been added. Meanwhile, the other sub-beam spot moves ahead of the main beam spot through an unrecorded portion, and therefore, its reflected light has not been affected by the variation in reflectance caused by the recorded mark. Consequently, only a signal representing a variation in the quantity of light due to the modulation of the light by the light source 110 is obtained from the reflected light of the sub-beam spot that moves ahead of the main beam spot.

For that reason, by calculating the difference between the two signals representing those two sub-beams, a read signal (i.e., a monitor signal for verification purposes) can be obtained.

By adopting the DRAW technique, even an apparatus that processes a storage medium with big storage capacity but a low degree of random accessibility such as an optical tape can also perform the verify operation while continuing the write operation. Consequently, a system that achieves even higher write and transfer rate and ensures a good deal of reliability is realized. And such a DRAW technique is also applicable effectively to an apparatus that uses multiple optical disc drives in combination.

As for the DRAW technique described above, however, the following respects need to be considered.

First of all, as already described for the example of the prior art, in order to realize a simple and low cost OPU (optical pickup unit) including multiple optical pickups to be built in an optical tape read/write drive, for example, structurally it is preferred to split the light emitted from a single light source into a read beam and a write beam. In that case, however, a write modulated signal will get superposed on a signal generated by the read beam, and therefore, the write modulated signal component should be canceled from the read signal as is done in the example of the prior art.

Meanwhile, even a read/write drive that is ordinarily used for archival purposes should presumably rewrite the data stored. In such a situation, it is preferred that a proper read signal be able to be obtained even while the operation of overwriting something on data already written is being performed.

Furthermore, in a system such as an optical tape read/write drive, the tracking direction as viewed from an optical pickup could possibly be bidirectional instead of unidirectional. Even so, the system should work with as good stability as in a situation where the tracking is carried out in one direction.

The optical read/write drive that has been described as an example of the prior art can cancel the write modulated signal component from the read signal only when one of the two sub-beams is scanning an unrecorded area. That is why such an optical read/write drive still has problems when it comes to overwrite and bidirectional operations.

It is therefore an object of the present invention to provide an optical pickup and optical read/write drive that can read a signal with good stability for verification purposes even when an overwrite operation should be performed on an area where data has already been written.

Another object of the present invention is to provide an optical pickup and optical read/write drive that can operate with as good stability as always even if the optical storage medium changes its traveling direction.

SUMMARY OF THE INVENTION

An optical pickup according to one embodiment of the present invention is used for writing and reading data on an optical storage medium that has a land and a groove track. The optical pickup comprises: a laser light source for emitting a light beam; a diffractive element for diffracting the light beam to split the light beam into multiple diffracted light beams, the multiple diffracted light beams including a zero-order diffracted light beam for writing data on a track of the land or the groove of the optical storage medium and non-zero-order diffracted light beams for reading the data from the track, the diffractive element comprising first and second diffraction gratings that have mutually different grating vector directions and pitches; a lens for condensing the diffracted light beams onto the optical storage medium; and a photodetector configured to receive at least part of the diffracted light beams reflected from the optical storage medium. The first diffraction grating is arranged to form light beam spots on the same track by the non-zero-order and zero-order diffracted light beams. The second diffraction grating is arranged to form a light beam spot so as to extend to both sides of said track, or arranged to form a light beam spot on one side of said track, by the non-zero-order diffracted light beams. The photodetector is configured to receive reflected light of the light beam spots formed by the diffracted light beam from the first diffraction grating, and configured to receive reflected light of the light beam spot formed by the non-zero-order diffracted light beam from the second diffraction grating so as to read data that has been written on said track.

In one preferred embodiment, the diffractive element is arranged so that two light beam spots are formed on mutually different tracks by the two non-zero-order diffracted light beams that have been produced by the first and second diffraction gratings, respectively.

In another preferred embodiment, the diffractive element is arranged so that the light beam spot formed by the non-zero-order diffracted light beam that has been produced by the second diffraction grating has a broader width than the light beam spot formed by the non-zero-order diffracted light beam that has been produced by the first diffraction grating.

In still another preferred embodiment, the first diffraction grating of the diffractive element splits the incoming light beam into the zero-order diffracted light beam and ±first-order diffracted light beams. The second diffraction grating of the diffractive element also splits the incoming light beam into the zero-order diffracted light beam and ±first-order diffracted light beams. And the ±first-order diffracted light beams produced by the second diffraction grating have different diffraction directions from the ±first-order diffracted light beams produced by the first diffraction grating.

In yet another preferred embodiment, the photodetector is arranged so as to receive reflected light of the light beam spots formed by the zero-order and ±first-order diffracted light beams that have been produced by the first diffraction grating and reflected light of the light beam spots formed by the ±first-order diffracted light beams that have been produced by the second diffraction grating.

In this particular preferred embodiment, the photodetector outputs a differential signal representing the difference between the intensity of the reflected light of the light beam spot formed by the +first-order or −first-order diffracted light beam that has been produced by the first diffraction grating and the intensity of the reflected light of the light beam spot formed by the +first-order or −first-order diffracted light beam that has been produced by the second diffraction grating.

A diffractive element according to the present invention is used in an optical pickup according to any of the preferred embodiments of the present invention described above. The diffractive element diffracts an incoming light beam and splits the light beam into multiple diffracted light beams including a zero-order diffracted light beam and non-zero-order diffracted light beams, and has first and second diffraction gratings that have mutually different grating vector directions and pitches.

In one preferred embodiment, the first and second diffraction gratings have been divided into a number of portions that are alternately distributed at multiple locations on the same plane.

In a specific preferred embodiment, the first and second diffraction gratings have been divided into a number of portions that are arranged in slips or in a checkerboard pattern.

In another preferred embodiment, the first and second diffraction gratings are stacked one upon the other.

An optical read/write drive according to the present invention includes at least one optical pickup according to any of the preferred embodiments of the present invention described above, an optical modulator, which modulates the intensity of the light beam so that a mark is recorded on the track by the zero-order diffracted light beam when data is going to be written on the track on the optical storage medium, and a signal processing unit, which reads the mark that has been recorded on the track based on the output of the optical pickup while writing data on the track on the optical storage medium.

The signal processing unit generates a read signal based on a differential signal representing the difference between the intensity of the reflected light of the light beam spot formed by the +first-order or −first-order diffracted light beam that has been produced by the first diffraction grating and the intensity of the reflected light of the light beam spot formed by the +first-order or −first-order diffracted light beam that has been produced by the second diffraction grating.

In one preferred embodiment, the optical modulator is built in the optical pickup.

In another preferred embodiment, the at least one optical pickup includes two or more optical pickups, and those optical pickups write data on multiple different tracks on the optical storage medium at the same time.

Another optical pickup according to the present invention includes: a laser light source; optical modulating means for recording a signal mark on an optical storage medium; a diffractive element which diffracts the light that has been emitted from the laser light source and splits the light into a zero-order light beam and ±first-order light beams; condensing means for condensing the diffracted light onto the surface of the optical storage medium; and a photodetector that receives the light that has been reflected from the optical storage medium. The optical pickup generates a read signal by calculating the difference between two signals that have been generated based on the reflected light of the ±first-order diffracted light beams that have been produced by the diffractive element, while performing a write operation using a light beam spot formed by the zero-order diffracted light beam. The diffractive element includes two kinds of diffraction gratings α and β that have mutually different grating vectors, and forms, on the surface of the optical storage medium, five light beam spots that are a light beam spot formed by the zero-order diffracted light beam, two light beam spots formed by the ±first-order diffracted light beams that have been produced by the diffraction grating α, and two more light beam spots formed by the ±first-order diffracted light beams that have been produced by the diffraction grating β. And by calculating the difference between a signal generated from the reflected light of the +first-order or −first-order diffracted light beam produced by the diffraction grating α and a signal generated from the reflected light of the +first-order or −first-order diffracted light beam produced by the diffraction grating β, the read signal is obtained.

Still another optical pickup according to the present invention includes: a laser light source; optical modulating means for recording a signal mark on an optical storage medium; a diffractive element, which diffracts the light that has been emitted from the laser light source and splits the light into a zero-order light beam and ±first-order light beams; condensing means for condensing the diffracted light onto the surface of the optical storage medium; and a photodetector that receives the light that has been reflected from the optical storage medium. The optical pickup generates a read signal by calculating the difference between two signals that have been generated based on the reflected light of the ±first-order diffracted light beams that have been produced by the diffractive element, while performing a write operation using a light beam spot formed by the zero-order diffracted light beam. The diffractive element has two gratings A and B. A condensed light beam spot formed by the ±first-order light beams that have been diffracted by the one grating B is arranged between two adjacent recording tracks on the optical storage medium. A light beam spot formed by the ±first-order light beams that have been diffracted by the other grating B is arranged on the same track as the spot formed by the zero-order light beam.

In one preferred embodiment, the read signal is generated by calculating the difference between a signal that has been obtained from a photodetector that receives a part of the ±first-order light beam that has been diffracted by the grating A, reflected from the optical storage medium, and scanned the surface of the optical storage medium later than the zero-order light beam and a signal that has been obtained from a photodetector that receives the reflected light of one of the ±first-order light beams that have been diffracted by the grating B.

In another preferred embodiment, the optical pickup includes two photodetectors that respectively receive reflected parts of the ±first-order light beams that have been diffracted by the grating A and generates a read signal by switching those two photodetectors according to the traveling direction of the storage medium.

Yet another optical pickup according to the present invention includes: a laser light source; optical modulating means for recording a signal mark on an optical storage medium; two diffractive elements with two diffractive surfaces, each of which diffracts the light that has been emitted from the laser light source and splits the light into a zero-order light beam and ±first-order light beams; condensing means for condensing the diffracted light onto the surface of the optical storage medium; and a photodetector that receives the light that has been reflected from the optical storage medium. The optical pickup generates a read signal by calculating the difference between two signals that have been generated based on the reflected light of the diffracted light beams that have been produced by the diffractive element, while performing a write operation using a light beam spot formed by the zero-order light beam. The two diffractive elements are two diffraction gratings C and D that have mutually different grating pitches and grating vectors. A condensed light beam spot formed by the ±first-order light beams that have been diffracted by the one diffraction grating C is arranged between two adjacent recording tracks on the optical storage medium. A light beam spot formed by the ±first-order light beams that have been diffracted by the other diffraction grating D is arranged on the same track as the spot formed by the zero-order light beam.

In one preferred embodiment, the read signal is generated by calculating the difference between a signal that has been obtained from a photodetector that receives a part of the ±first-order light beam that has been diffracted by the diffractive element D, reflected from the optical storage medium, and scanned the surface of the optical storage medium later than the zero-order light beam and a signal that has been obtained from a photodetector that receives the reflected light of one of the ±first-order light beams that have been diffracted by the diffractive element E.

In another preferred embodiment, the optical pickup includes two photodetectors that respectively receive reflected parts of the ±first-order light beams that have been diffracted by the diffractive element D and generates a read signal by switching those two photodetectors according to the traveling direction of the storage medium.

Yet another optical pickup according to the present invention includes: a laser light source; optical modulating means for recording a signal mark on an optical storage medium; a diffractive element, which diffracts the light that has been emitted from the laser light source and splits the light into a zero-order light beam and ±first-order light beams; condensing means for condensing the diffracted light onto the surface of the optical storage medium; and a photodetector that receives the light that has been reflected from the optical storage medium. The optical pickup generates a read signal by calculating the difference between two signals that have been generated based on the reflected light of the ±first-order diffracted light beams that have been produced by the diffractive element, while performing a write operation using a light beam spot formed by the zero-order light beam. The diffractive element has two grating E and F, and gives an aberration to the light that has been diffracted by the grating E but gives no aberration to the light that has been diffracted by the grating F.

In one preferred embodiment, the read signal is generated by calculating the difference between a signal that has been obtained from a photodetector that receives a part of the ±first-order light beam that has been diffracted by the grating F, reflected from the optical storage medium, and scanned the surface of the optical storage medium later than the zero-order light beam and a signal that has been obtained from a photodetector that receives the reflected light of one of the ±first-order light beams that have been diffracted by the grating E.

In another preferred embodiment, the optical pickup includes two photodetectors that respectively receive reflected parts of the ±first-order light beams that have been diffracted by the grating F and generates a read signal by switching those two photodetectors according to the traveling direction of the storage medium.

In still another preferred embodiment, a main tracking error signal is obtained by a push-pull method from a photodetector, which receives a reflected part of the zero-order light beam that has been transmitted through the diffractive element and which is divided into multiple areas, sub-tracking error signals are generated by the push-pull method by a photodetector, which receives a reflected part of the light beam that has been diffracted by the grating A of the diffractive element and which is also divided into multiple areas, and arithmetic operations are performed on these main and sub-tracking error signals, thereby obtaining an offset-free tracking error signal.

In yet another preferred embodiment, a main tracking error signal is obtained by a push-pull method from a photodetector, which receives a reflected part of the zero-order light beam that has been transmitted through the diffractive element and which is divided into multiple areas, sub-tracking error signals are generated by the push-pull method by a photodetector, which receives a reflected part of the light beam that has been diffracted by the diffractive element F and which is also divided into multiple areas, and arithmetic operations are performed on these main and sub-tracking error signals, thereby obtaining an offset-free tracking error signal.

According to the present invention, even when an overwrite operation is performed on an optical storage medium on which data has already been written, a DRAW operation can also be performed using a good read signal that has no optically modulated component of the light source. According to a preferred embodiment of the present invention, even if the given optical storage medium has changed its traveling direction, such a change can also be coped with by switching the photodetectors to use. In addition, according to a preferred embodiment of the present invention, a DC-offset-free tracking signal can be obtained with good stability by using a main beam spot for writing and sub-beam spots for reading. Consequently, data can be written and stored on an optical storage medium with good quality ensured.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2A is a plan view schematically illustrating a configuration for an optical disc 6a.

FIG. 4 illustrates two diffraction gratings of the diffractive element and how incoming light gets diffracted by those diffraction gratings.

Figure 9:
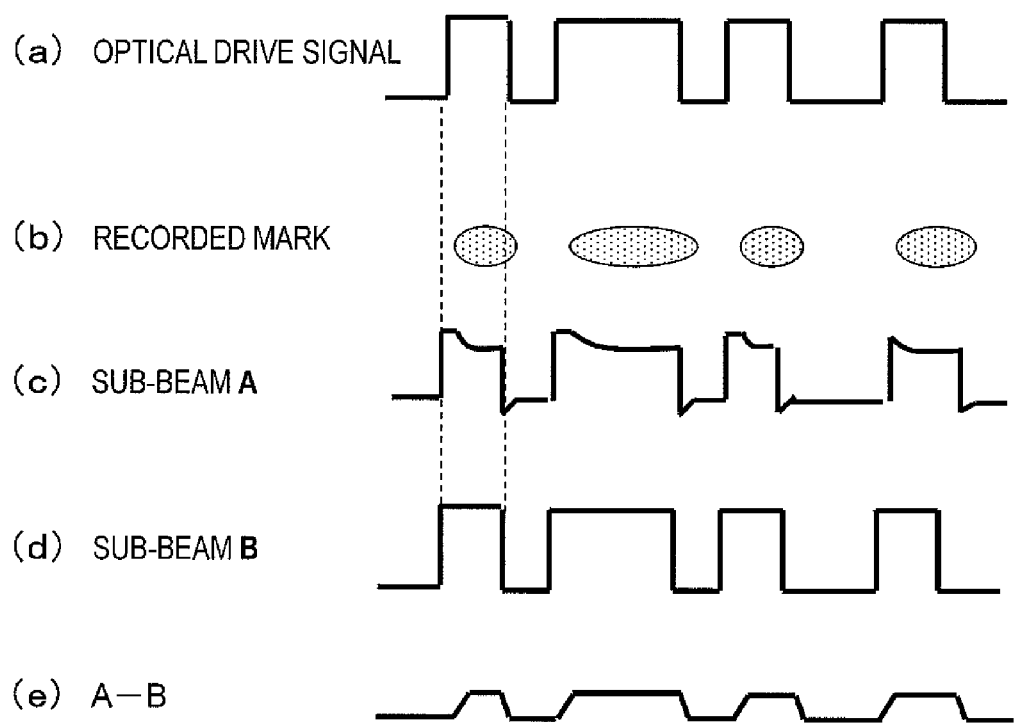

Portion (a) of FIG. 9 shows the waveform of an optical drive signal. Portion (b) of FIG. 9 illustrates the shapes of marks to be recorded on a track. Portions (c) and (d) of FIG. 9 illustrate the respective waveforms of the reflected light of the sub-spots +1A and +1B, respectively. And portion (e) of FIG. 9 illustrates the waveform of a differential signal obtained by subtracting the signal representing the reflected light of the sub-spot +1B from the signal representing the reflected light of the sub-spot +1A.

Figure 10:
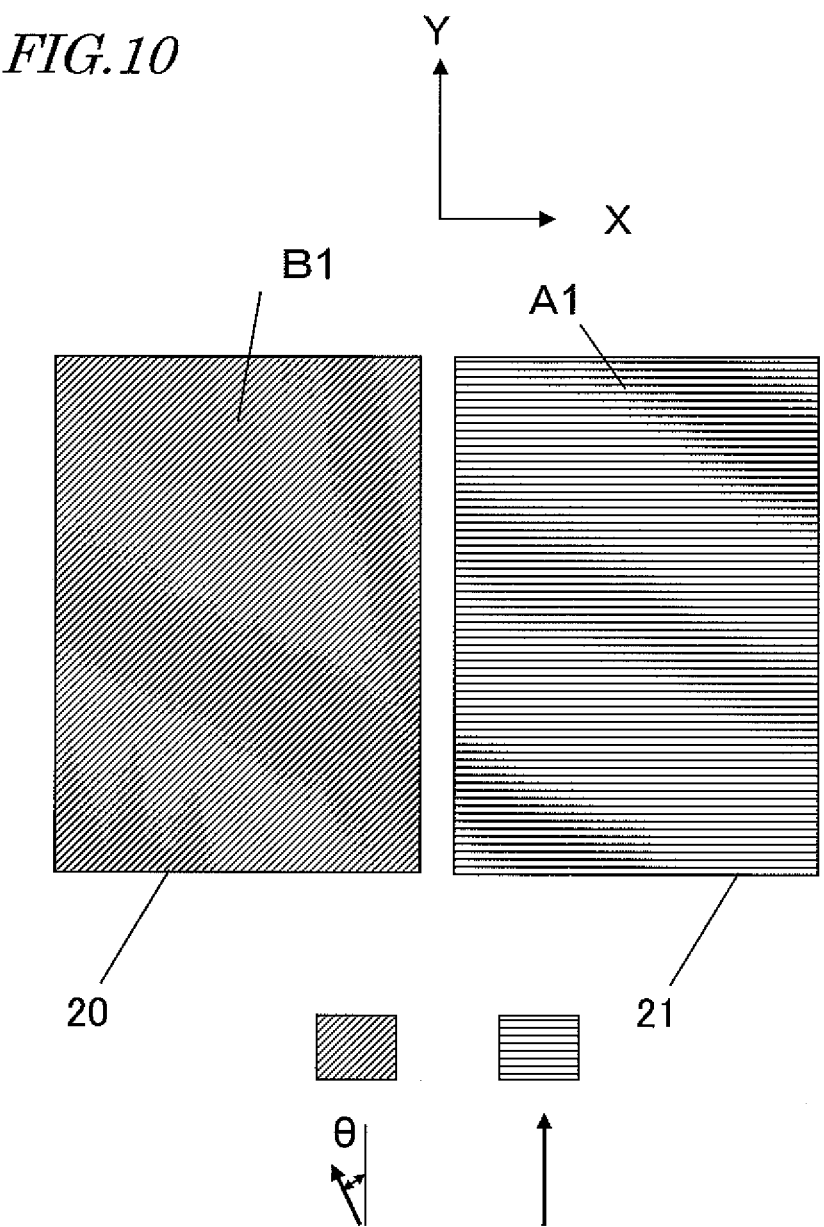

FIG. 10 is a plan view illustrating diffractive elements according to a second specific preferred embodiment of the present invention.

Figure 11:
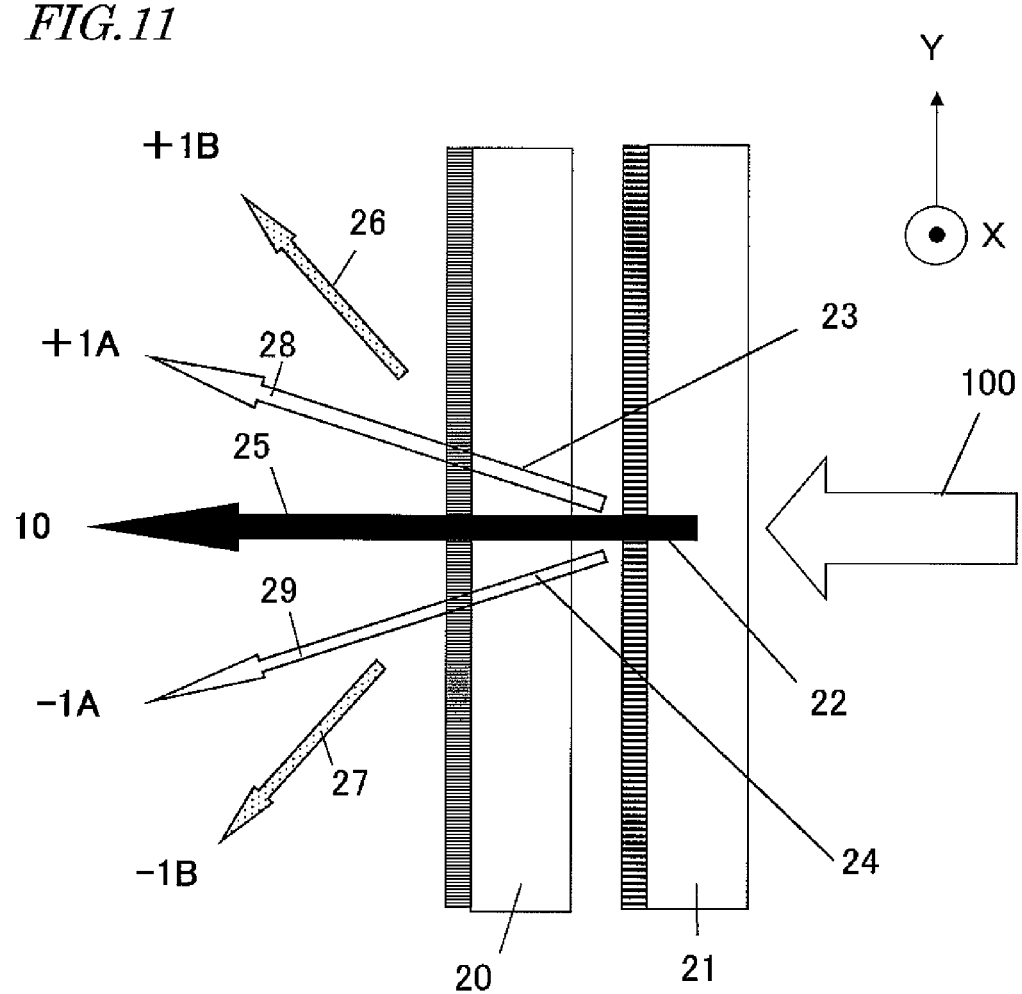

FIG. 11 is a side view illustrating the diffractive elements according to the second preferred embodiment of the present invention.

Figure 12:
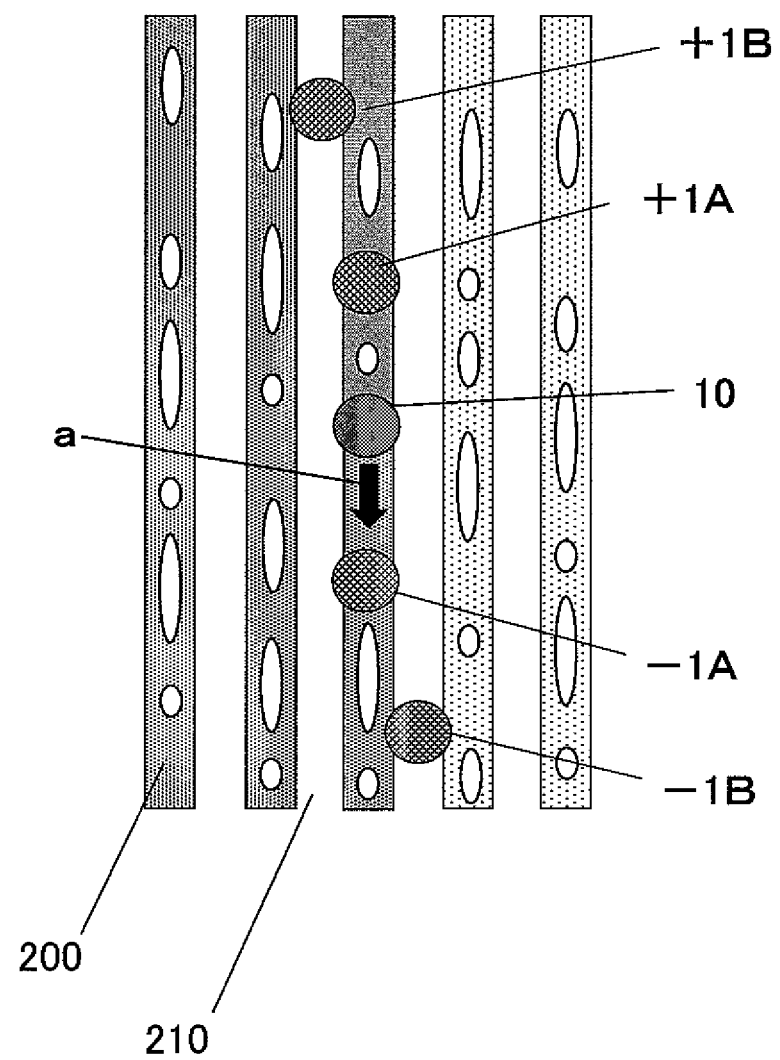

FIG. 12 illustrates the arrangement of light beam spots formed on an optical storage medium according to the second preferred embodiment of the present invention.

FIGS. 13(a) and 13(b) are respectively a plan view and a side view illustrating a diffractive element according to a third preferred embodiment of the present invention.

Figure 14:
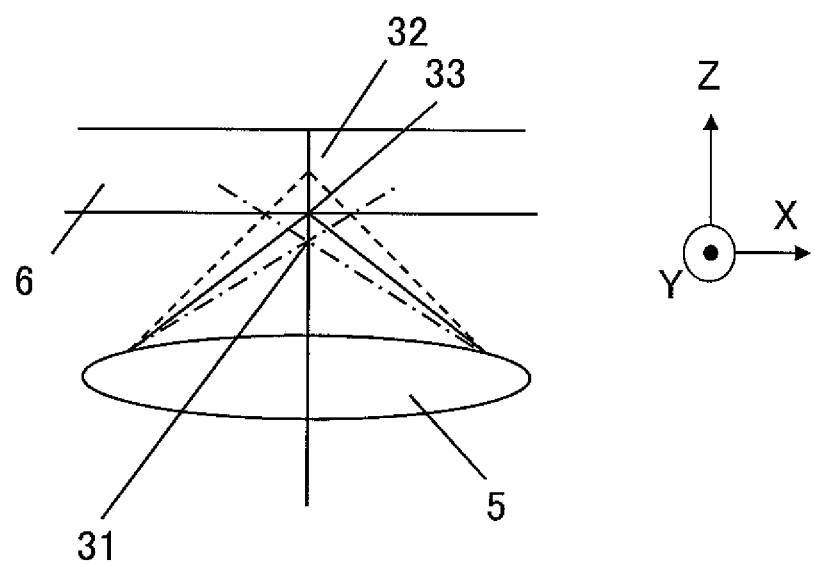

FIG. 14 is a cross-sectional view illustrating how the light that has been diffracted by the diffractive element according to the third preferred embodiment of the present invention is condensed by an objective lens.

Figure 15:
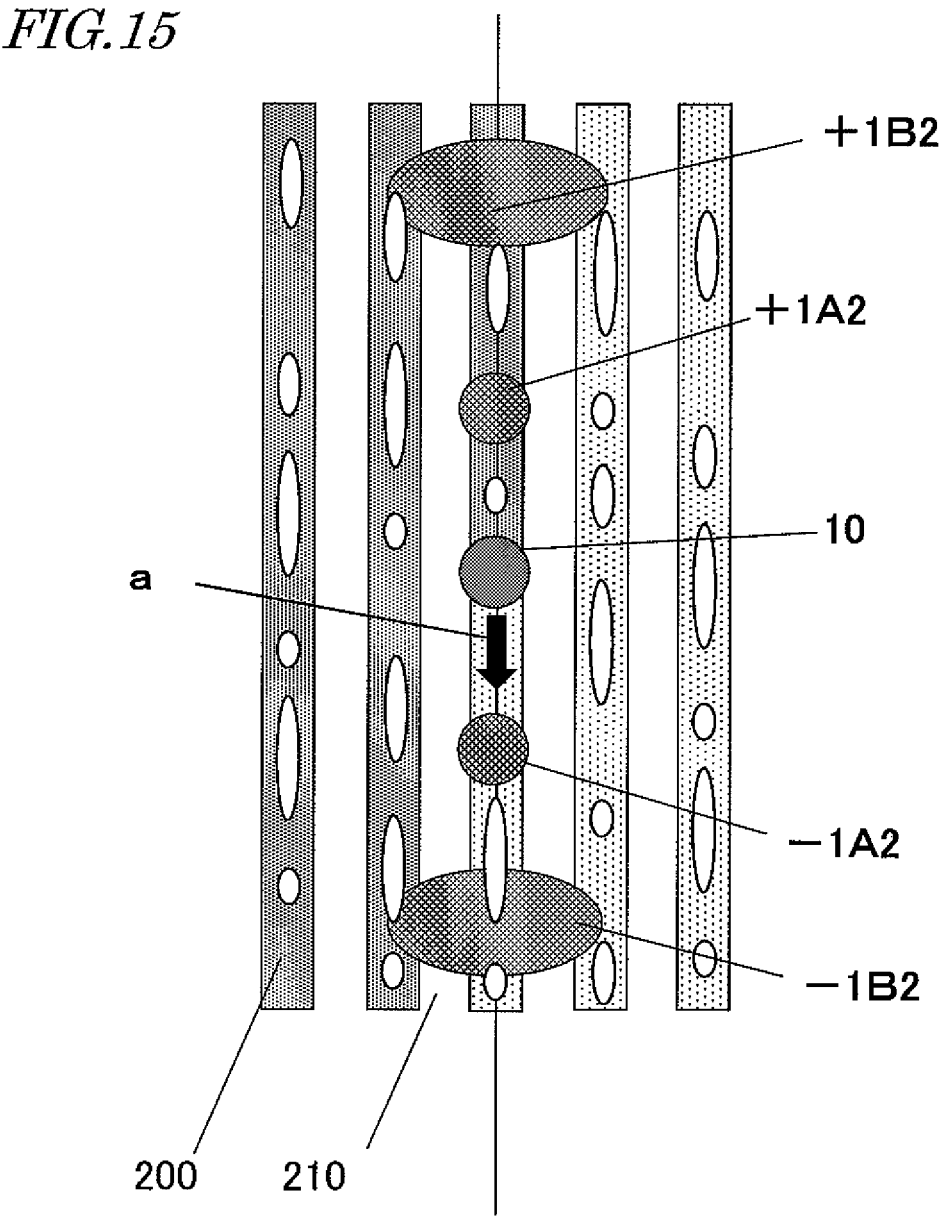

FIG. 15 illustrates the arrangement of light beam spots formed on an optical storage medium according to the third preferred embodiment of the present invention.

Figure 16:
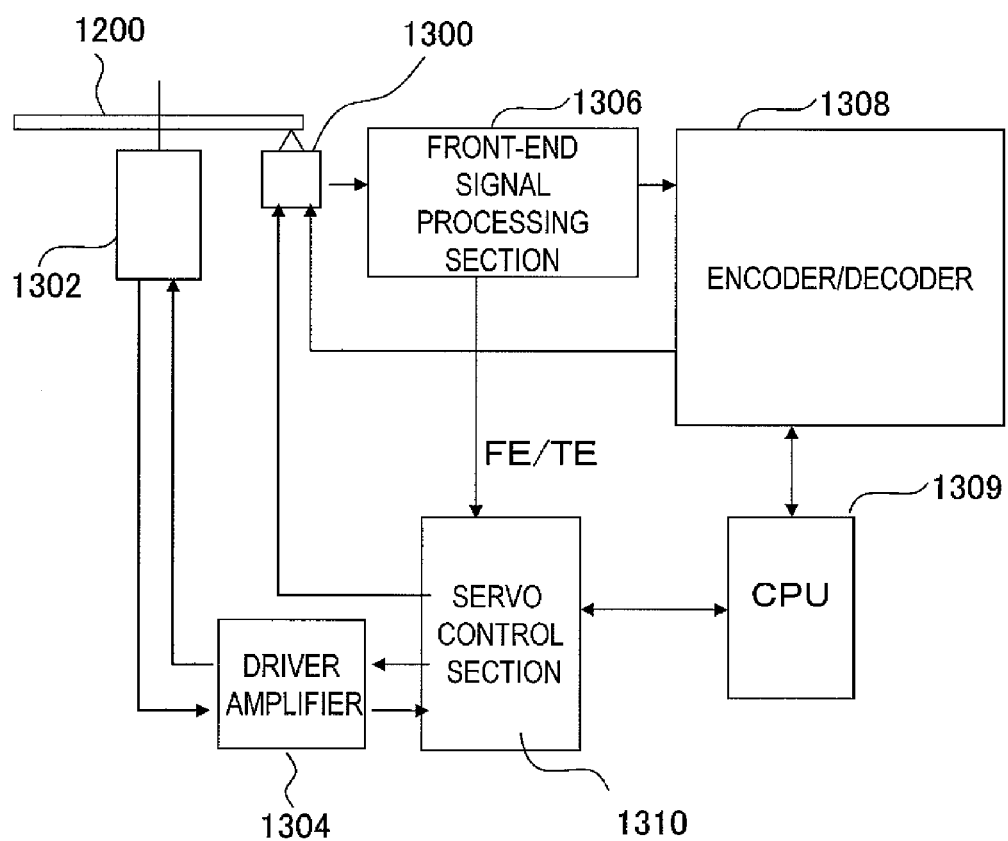

FIG. 16 illustrates an exemplary configuration for an optical read/write drive as a preferred embodiment of the present invention.

Figure 17:
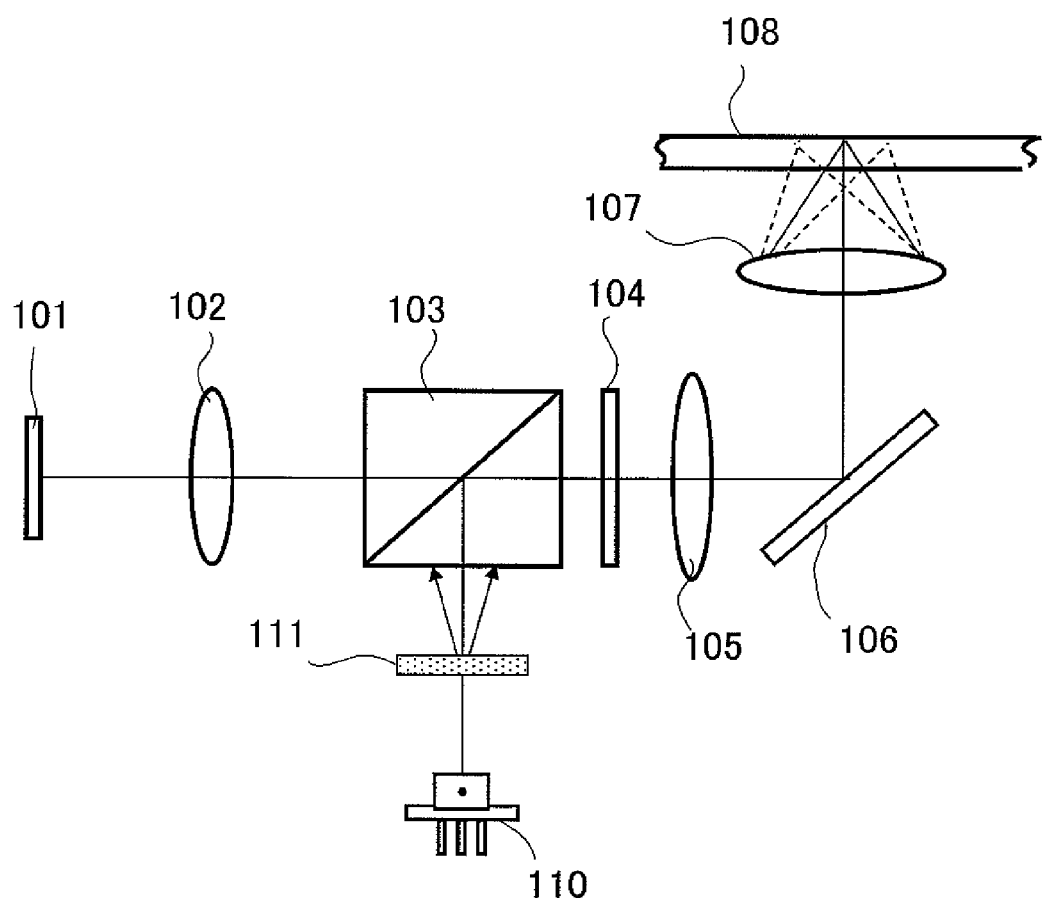

FIG. 17 illustrates an arrangement for an optical pickup in a conventional optical read/write drive.

Figure 18:
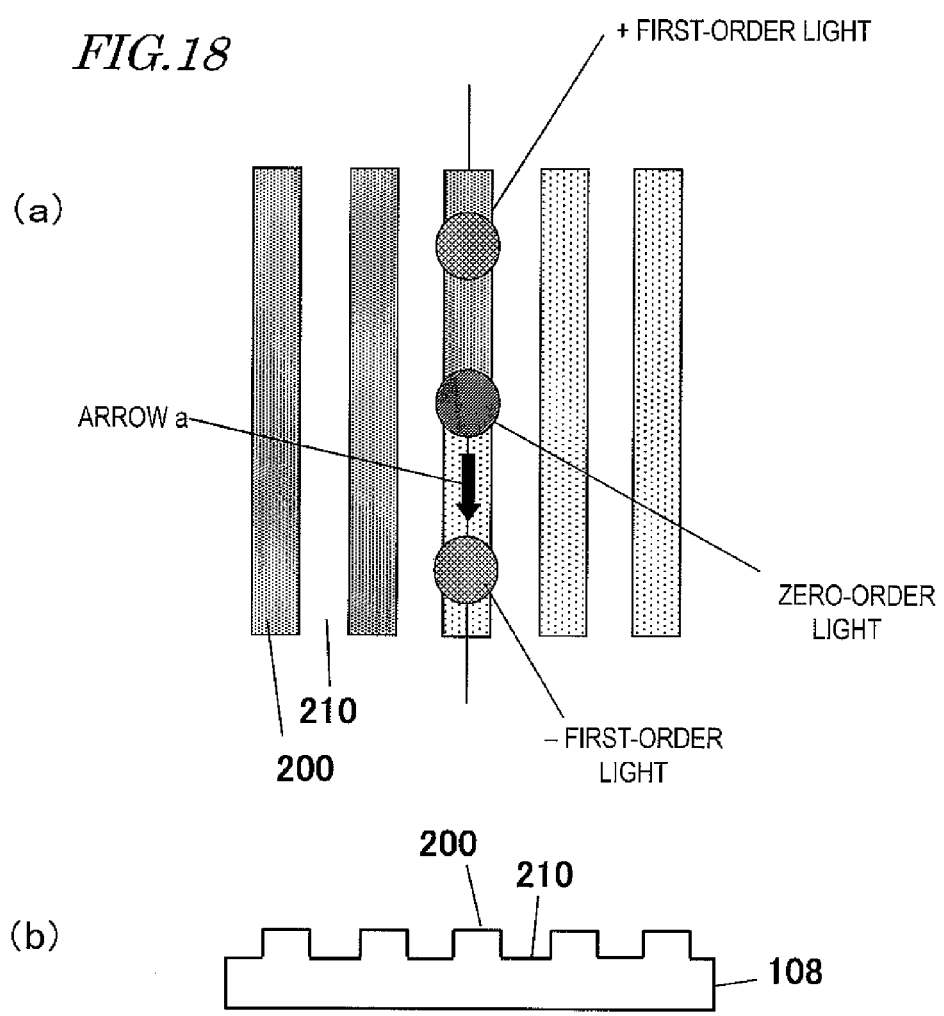

FIGS. 18(a) and 18(b) are respectively a plan view illustrating where light beam spots are formed by the conventional optical read/write drive on an optical storage medium and a cross-sectional view of an optical disc 108.

Figure 19:
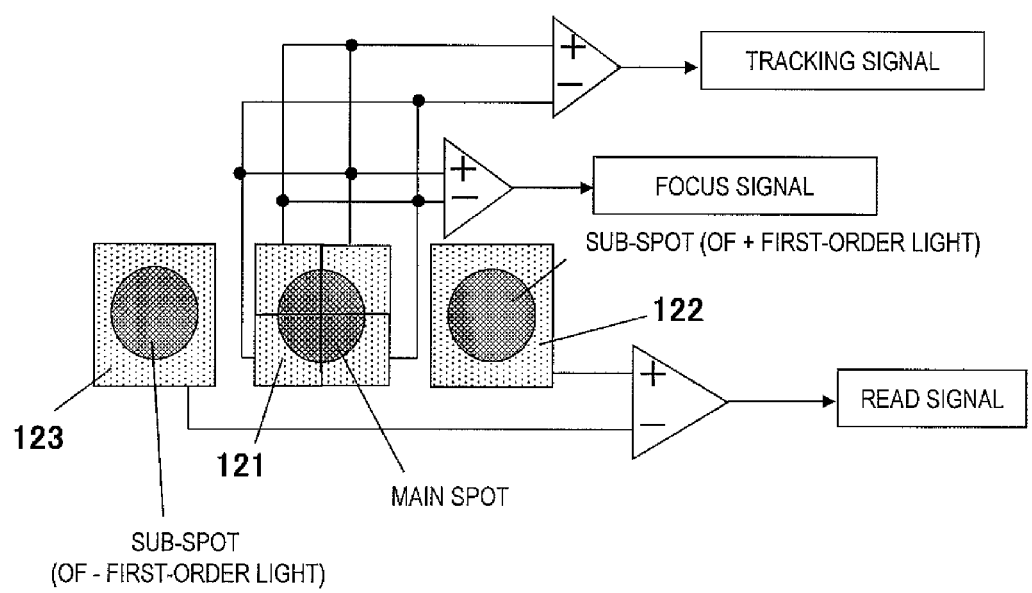

FIG. 19 illustrates a configuration for a photodetector in the conventional optical read/write drive.

DETAILED DESCRIPTION OF PREFERRED EMBODIMENTS

Hereinafter, exemplary embodiments of the present invention will be described in detail with reference to the accompanying drawings.

Figure 1:
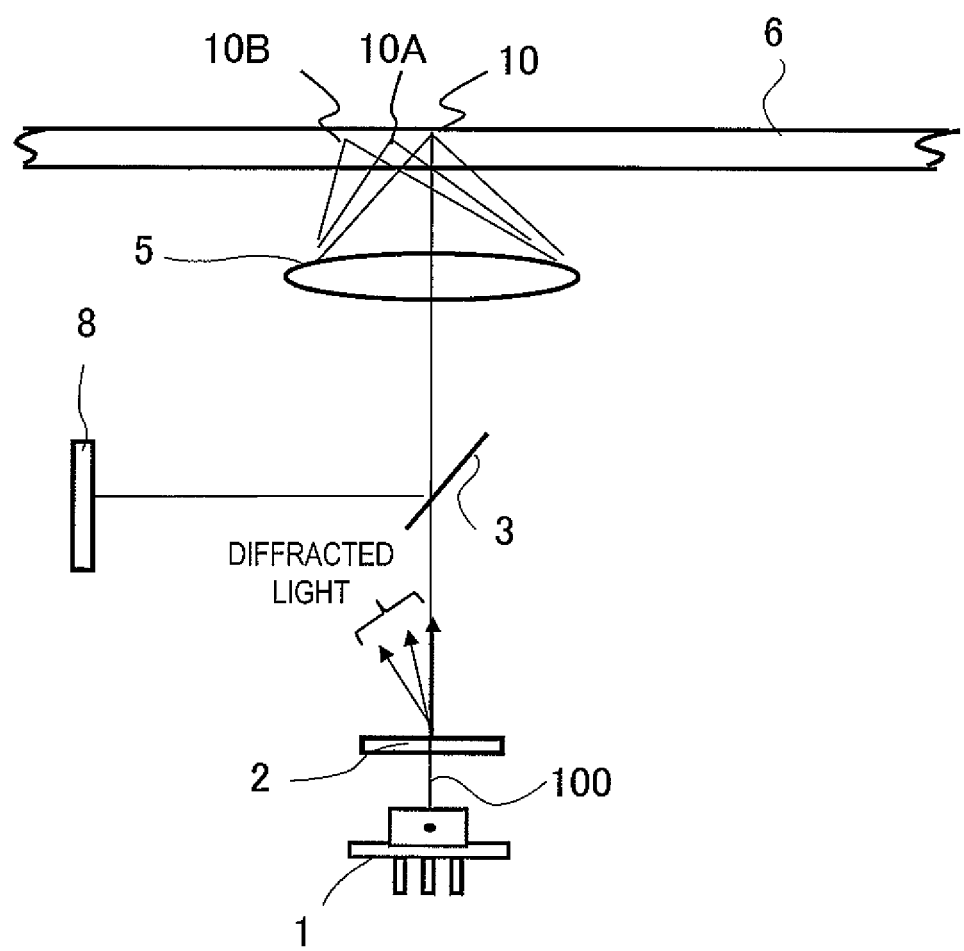
FIG. 1 illustrates an arrangement for an optical pickup as a specific example of the present invention.

First of all, before specific embodiments of the present invention are described, it will be described with reference to FIGS. 1 through 4 what arrangement may be used for an optical pickup according to the present invention and how it works. FIG. 1 illustrates an arrangement for an optical system for an optical pickup as a specific example of the present invention. The optical pickup shown in FIG. 1 is used to write data on a track on an optical storage medium 6 and to read the data that has been written on the track.

Figure 2A:
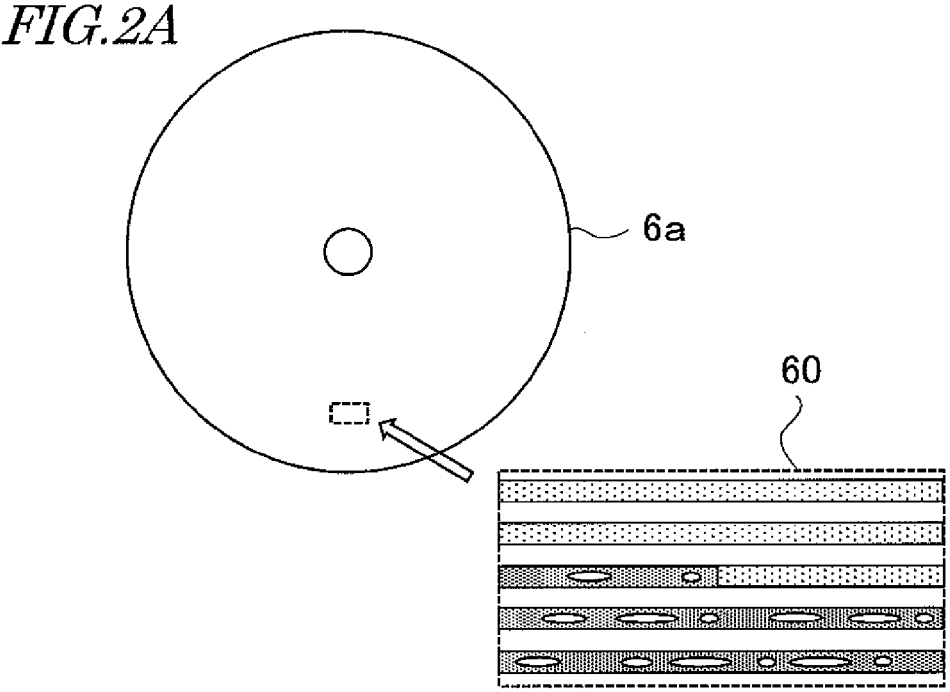
Figure 2B:
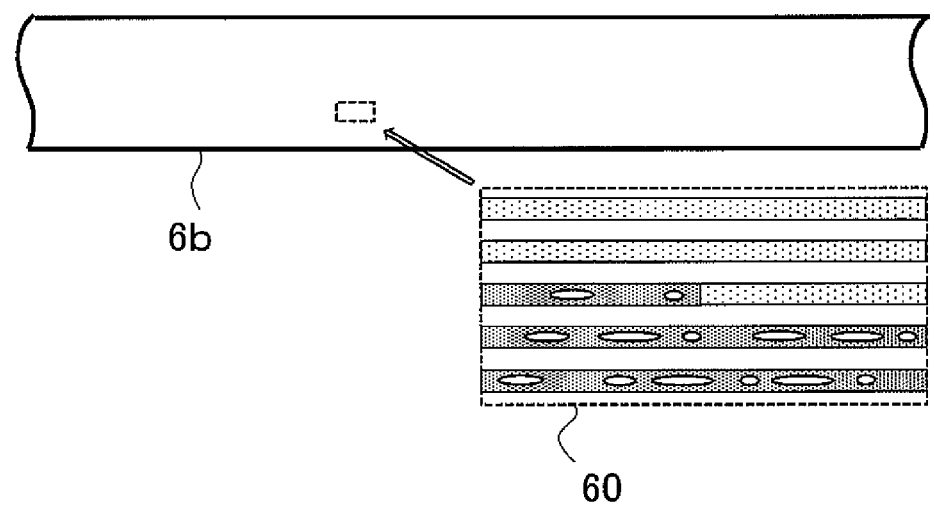
FIG. 2B is a plan view schematically illustrating a configuration for an optical tape 6b.

As the optical storage medium 6, either the optical disc 6a shown in FIG. 2A or the optical tape 6b shown in FIG. 2B may be used, for example. Specifically, in FIG. 2A, five tracks are drawn in an area 60 illustrating a dotted rectangular portion of the optical disc 6a on a larger scale. The optical disc 6a has a number of concentric or spiral tracks. Likewise, in FIG. 2B, five tracks are also drawn in an area 60 illustrating a dotted rectangular portion of the optical tape 6b on a larger scale. The optical tape 6b has a number of tracks that are arranged parallel to each other. In reading or writing data from/on it, the optical disc 6a rotates but the optical tape 6b runs in the longitudinal direction.

Figure 2C:
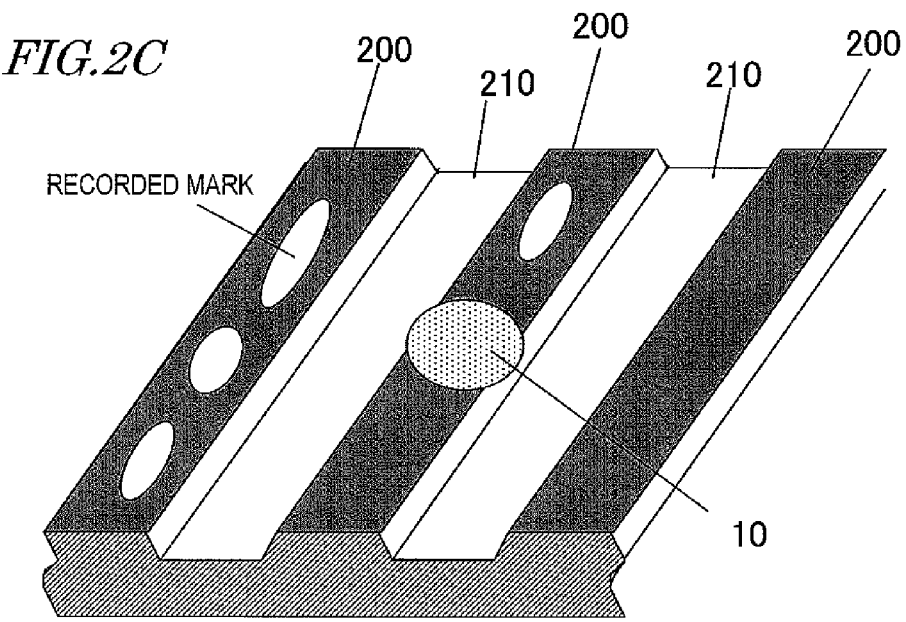
FIG. 2C is a schematic perspective view illustrating a portion of an optical storage medium on a larger scale.
Figure 2D:
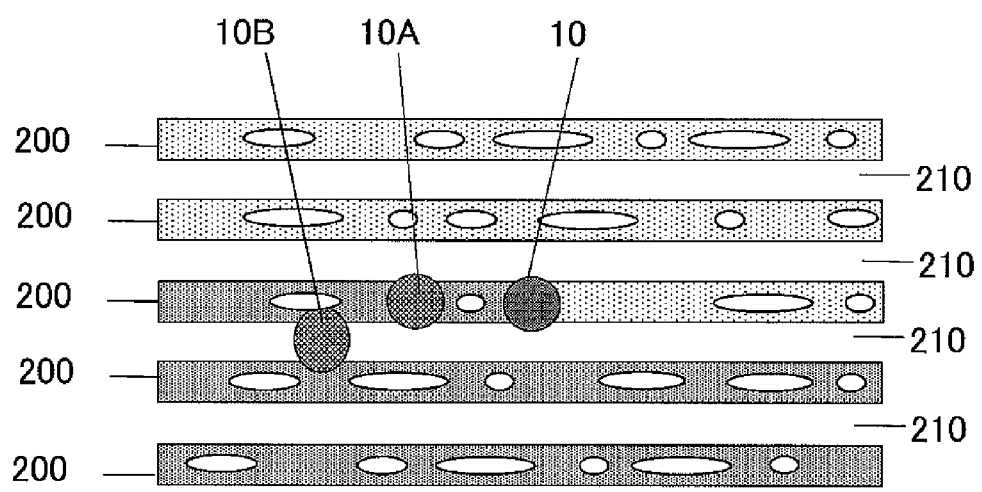
FIG. 2D is a plan view illustrating an exemplary arrangement of light beam spots that are formed by the optical pickup on the optical storage medium.

FIG. 2C is a schematic perspective view illustrating a portion of such an optical storage medium on a larger scale. In FIG. 2C, illustrated is a main spot 10 for use to write data. FIG. 2D is a plan view illustrating an exemplary arrangement of light beam spots that are formed by this optical pickup on the optical storage medium 6. Specifically, in FIG. 2D, shown are the main spot for use to write data and sub-spots 10A and 10B to be described in detail later.

As shown in FIG. 2C, the optical storage medium 6 has a structure in which lands 200 and grooves 210 are arranged alternately. In the example illustrated in FIG. 2C, the bottom of the grooves 210 is deeper than the top of the lands 200. Although a multilayer structure including a recording layer and a protective coating is actually stacked on the surface of a substrate or film with such lands 200 and grooves 210, illustration of that multilayer structure is omitted in FIG. 2C for the sake of simplicity.

In this example, marks are recorded only on the lands 200 of the optical storage medium 6, not on the grooves 210. In other words, in this example, the lands 200 function as "track (s)" and the grooves 210 are used to generate a tracking error signal, which is necessary for a light beam spot to follow the tracks and scan the disc just as intended. As used herein, the term "track" means a region on which marks are written.

Alternatively, contrary to this example, marks may also be recorded only on the grooves 210 of the optical storage medium 6. In that case, the grooves 210 function as tracks. As can be seen, marks may be recorded on either the lands 200 or the grooves 210, not both.

Now take a look at FIG. 1 again. This optical pickup includes a laser light source 1 that emits a light beam 100, a diffractive element 2 that diffracts the light beam 100 and splits it into multiple diffracted light beams including a zero-order diffracted light beam and non-zero-order diffracted light beams, a lens 5 that condenses those diffracted light beams onto the optical storage medium 6, and a photodetector 8 that receives at least some of those diffracted light beams that have been reflected from the optical storage medium 6.

In FIG. 1, illustrated schematically are three diffracted light beams that have left the diffractive element 2. Actually, however, more diffracted light beams may be produced. One of the three diffracted light beams is a zero-order diffracted light beam, while the two others are non-zero-order diffracted light beams. It should be noted that the angle of diffraction shown in FIG. 1 is exaggerated and is larger than the actual one. Each of these three diffracted light beams is transmitted through the lens 5 and forms a light beam spot on the optical storage medium 6. In this manner, not just the main spot 10 but also sub-spots 10A and 10B are formed by those diffracted light beams on the optical storage medium 6 as shown in FIG. 2D.

The main spot 10 shown in FIG. 2D is formed by converging the zero-order diffracted light beam onto the storage medium 6. On the other hand, the sub-spots 10A and 10B are formed by converging some of the other non-zero-order diffracted light beams onto the storage medium 6. In the example illustrated in FIG. 2D, the sub-spot 10A and the main spot 10 are formed on the same track. Meanwhile, the sub-spot 10B is formed on a groove 210 on which no mark has been recorded in this example. Since light beam spots are formed in the pattern shown in FIG. 2D by those diffracted light beams into which a single light beam has been split, the diffractive element 2 plays an important role. The sub-spot 10B can be located on the other groove(s) 210 that is not adjacent to the track on which the main spot 10 is located. Alternatively, the sub-spot 10B can be formed to extend widely to the both sides of the track on which the main spot 10 is located. The location and size of the sub-spot 10B can be determined so that the signal obtained from the sub-spot 10B should serve as a reference signal for removing the modulation component from the signal obtained from the main-spot 10A.

Figure 3:
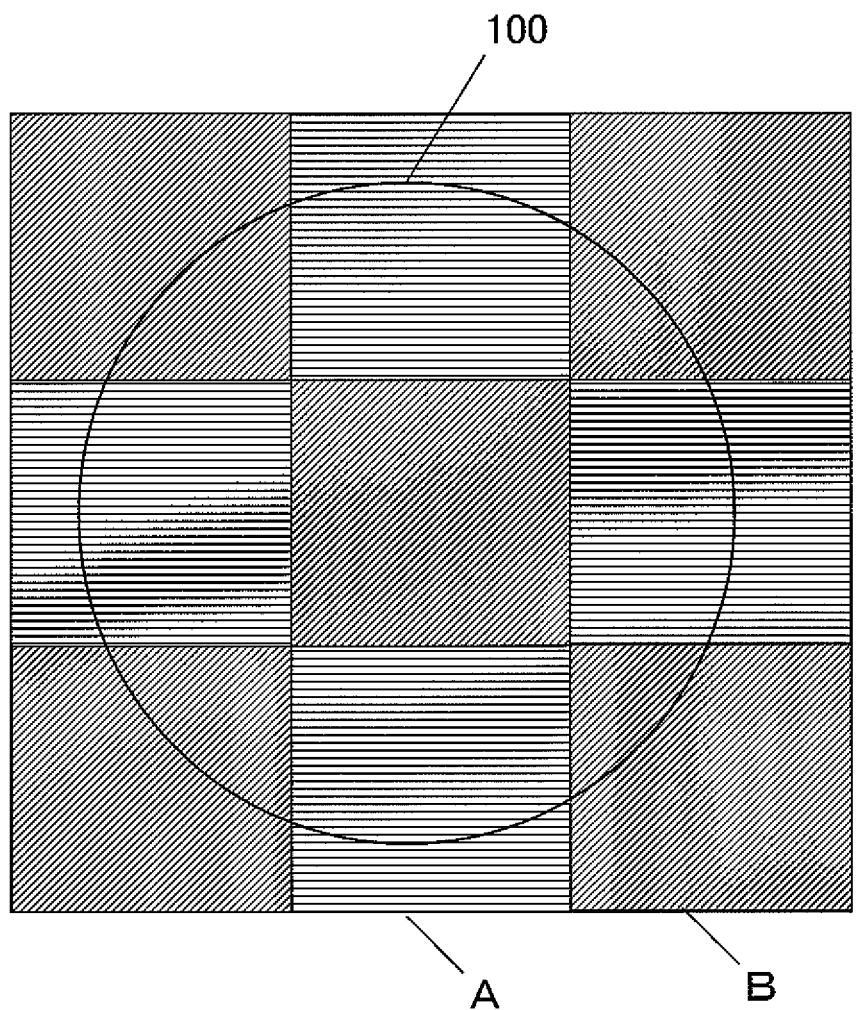
FIG. 3 is a plan view illustrating an exemplary arrangement for a diffractive element.

As shown in FIG. 3, the diffractive element 2 may have first and second diffraction gratings A and B, which have mutually different grating vector directions and pitches. The upper portion of FIG. 4 illustrates the respective planar shapes of the first and second diffraction gratings A and B, while the lower portion of FIG. 4 illustrates how the incoming light gets diffracted by these first and second diffraction gratings A and B. In the example illustrated in FIG. 4, the light beam 100 that has been incident on the first diffraction grating A is split into a zero-order diffracted light beam and ±first-order diffracted light beams. In the same way, the light beam 100 that has been incident on the second diffraction grating B is also split into a zero-order diffracted light beam and ±first-order diffracted light beams. In this example, the first diffraction grating A has a greater grating vector pitch than the second diffraction grating B. For that reason, the first diffraction grating A has a smaller angle of diffraction than the second diffraction grating B. If the light source has a wavelength of 0.405 μm, for example, the first and second diffraction gratings A and B may have grating vector pitches of 20 μm and 10 μm, respectively.

The first diffraction grating A is arranged so that the light beam spots of the non-zero-order diffracted light beams produced by that grating A will be located on the same track as the light beam spot of the zero-order diffracted light beam. On the other hand, the second diffraction grating B is arranged so that the light beam spots of the non-zero-order diffracted light beams produced by that grating will be located on one side of the track, or will extend to both sides of the track. Such an arrangement is realized by tilting the grating vector direction of the second diffraction grating B with respect to that of the first diffraction grating A. And the angle defined between these two grating vectors may be set to be 0.5 to 0.7 degrees, for example.

In FIG. 3, a cross section of the light beam 100 that is incident on this diffractive element 2 is indicated by the circle. The respective sizes and arrangement of the first and second diffraction gratings A and B are determined so that the light beam 100 enters the first and second diffraction gratings A and B at the same time. Portions of the light beam 100 that have entered the first diffraction grating A get diffracted by the first diffraction grating A. On the other hand, portions of the light beam 100 that have entered the second diffraction grating B get diffracted by the second diffraction grating B. In this manner, multiple diffracted light beams as schematically shown in FIG. 1 can be obtained from the single incoming light beam 100 and the light beam spots can be formed in the pattern shown in FIG. 2D.

It should be noted that the first and second diffraction gratings A and B of the diffractive element 2 do not always have to be arranged as in the example shown in FIG. 3. Alternatively, the first and second diffraction gratings A and B may be arranged in any other pattern as long as the first and second diffraction gratings A and B are alternately distributed at multiple locations on the same plane. For example, the first and second diffraction gratings A and B may be arranged either in slips or in a checkerboard pattern. Alternatively, the first and second diffraction gratings A and B may also be arranged concentrically or to form an evenly divided pie chart.

If the light beam spots 10, 10A and 10B are formed in the pattern shown in FIG. 2D on the optical storage medium by using such a diffractive element 2, a verify operation can be performed in real time based on the intensities of the reflected light of the sub-spots 10A and 10B while a mark is being recorded with the main spot 10.

The photodetector 8 shown in FIG. 1 is arranged so as to receive reflected light of the light beam spots formed by the diffracted light beams that have been produced by the first diffraction grating A and the reflected light of the light beam spots formed by the non-zero-order diffracted light beams that have been produced by the second diffraction grating B.

Hereinafter, specific preferred embodiments of the present invention will be described in further detail.

Embodiment 1

Hereinafter, an optical pickup as a first specific preferred embodiment of the present invention will be described.

Figure 5:
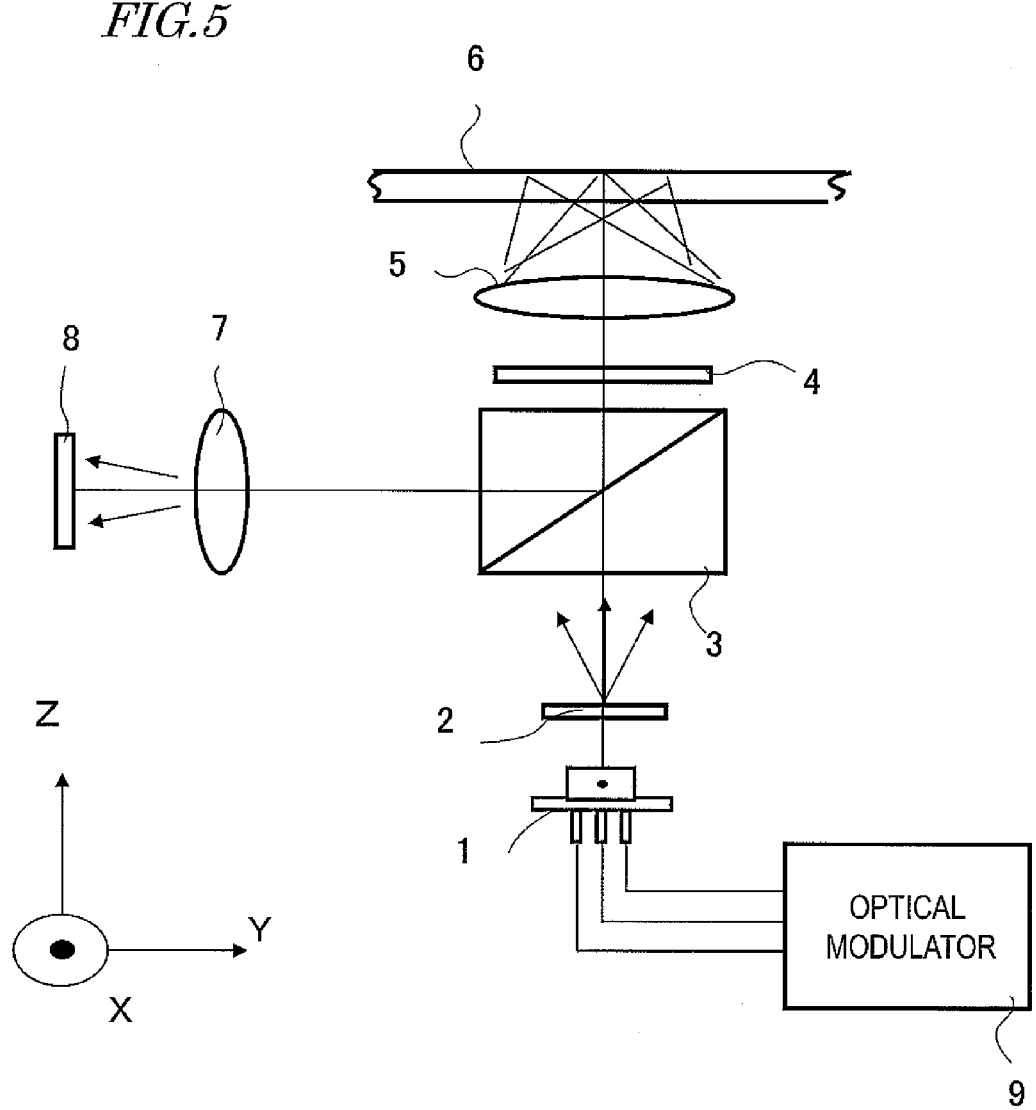
FIG. 5 illustrates an arrangement for an optical pickup as a first specific preferred embodiment of the present invention.

FIG. 5 illustrates the arrangement of an optical system for the optical pickup as the first preferred embodiment of the present invention. This optical pickup includes a laser light source 1, an optical modulator 9 for use to leave a signal mark on an optical storage medium 6, a diffractive element 2 that diffracts the light that has come from the laser light source 1 and splits it into a zero-order light beam and ±first-order light beams, a condenser lens 5 that condenses those diffracted light beams onto the optical storage medium 6, and a photodetector 8 that receives the light beams that have been reflected from the optical storage medium 6. With this optical pickup, while a write operation is being performed using the light beam spot formed by the zero-order light beam, a read signal can also be obtained by calculating the difference between the signals generated based on the reflected light of the ±first-order light beams that have been produced by the diffractive element 2. The optical modulator 9 is typically built in the optical pickup but may also be arranged outside of the optical pickup.

The diffractive element 2 includes two diffraction gratings that have mutually different grating vectors, and leaves a total of five light beam spots on the optical storage medium 6—one light beam spot of the zero-order light beam, two light beam spots of the ±first-order light beams produced by the first diffraction grating, and two more light beam spots of the ±first-order light beams produced by the second diffraction grating. And by calculating the difference between two signals, each of which has been generated based on the reflected light of the +first-order or −first-order light beam produced by the first or second diffraction grating, a read signal (i.e., a monitor signal for use to perform a verify operation) is obtained.

It should be noted that the optical pickup's optical system with the arrangement shown in FIG. 5 will also be used in the second and third preferred embodiments of the present invention to be described later. Those preferred embodiments are different from this first preferred embodiment only in the structure of the diffractive element 2.

In the preferred embodiment illustrated in FIG. 5, the light that has been emitted from the laser light source 1 gets diffracted and split by the diffractive element 2 into a zero-order light beam and ±first-order light beams. Those light beams are transmitted through, and transformed into circularly polarized light beams by, a polarization beam splitter 3 and a wave plate 4 and then condensed by an objective lens 5, thereby leaving light beam spots on the storage layer of the optical storage medium 6. On their way back, the light beams that have been reflected from the optical storage medium 6 are transmitted through, and transformed into linearly polarized light beams (that are perpendicular to the light beams on their way toward the storage medium) by, the objective lens 5 and the wave plate 4, reflected by the polarization beam splitter 3, given astigmatism by a detector lens 7, and then received by photodiodes of the photodetector 8.

In the following description, the optical axis direction of the focusing optical system will be referred to herein as "Z-axis direction", the radial direction of the optical storage medium 6 as "X-axis direction" and the tracking direction (i.e., the tangential direction) of the optical storage medium 6 as "Y-direction", respectively, as shown in FIG. 5 unless stated otherwise. It should be noted that even if the optical axis is refracted by a mirror or a prism in an optical system for an optical head, the directions will also be defined with respect to the optical axis and the map of the optical storage medium 6.

FIG. 6(a) is a plan view illustrating the diffractive element 2. The diffractive element 2 of this preferred embodiment is divided into multiple slips in the Y direction (i.e., in the tangential direction), and two different (i.e., first and second) diffraction gratings A and B, which will be simply referred to herein as "gratings A and B", are arranged alternately.

The grating vector of the grating A agrees with the Y direction. On the other hand, the grating vector of the grating B slightly tilts toward the X direction from the Y direction, and has a smaller grating pitch than the grating A.

FIG. 6(b) is a cross-sectional view of the diffractive element 2. As the diffractive element 2 has two different gratings A and B, the light that has been incident on the diffractive element 2 gets diffracted and split into five beams in total, namely, ±first-order diffracted light beams produced by the grating A, ±first-order diffracted light beams produced by the grating B, and a zero-order light beam produced by the gratings A and B. Among these diffracted light beams, the zero-order light beam has higher diffraction efficiency than any other light beam.

In the following description, the four light beam spots formed on the optical storage medium by the ±first-order diffracted light beams produced by the grating A and the ±first-order diffracted light beams produced by the grating B will be identified herein by +1A, −1A, +1B and −1B, respectively, for the sake of simplicity.

Figure 7:
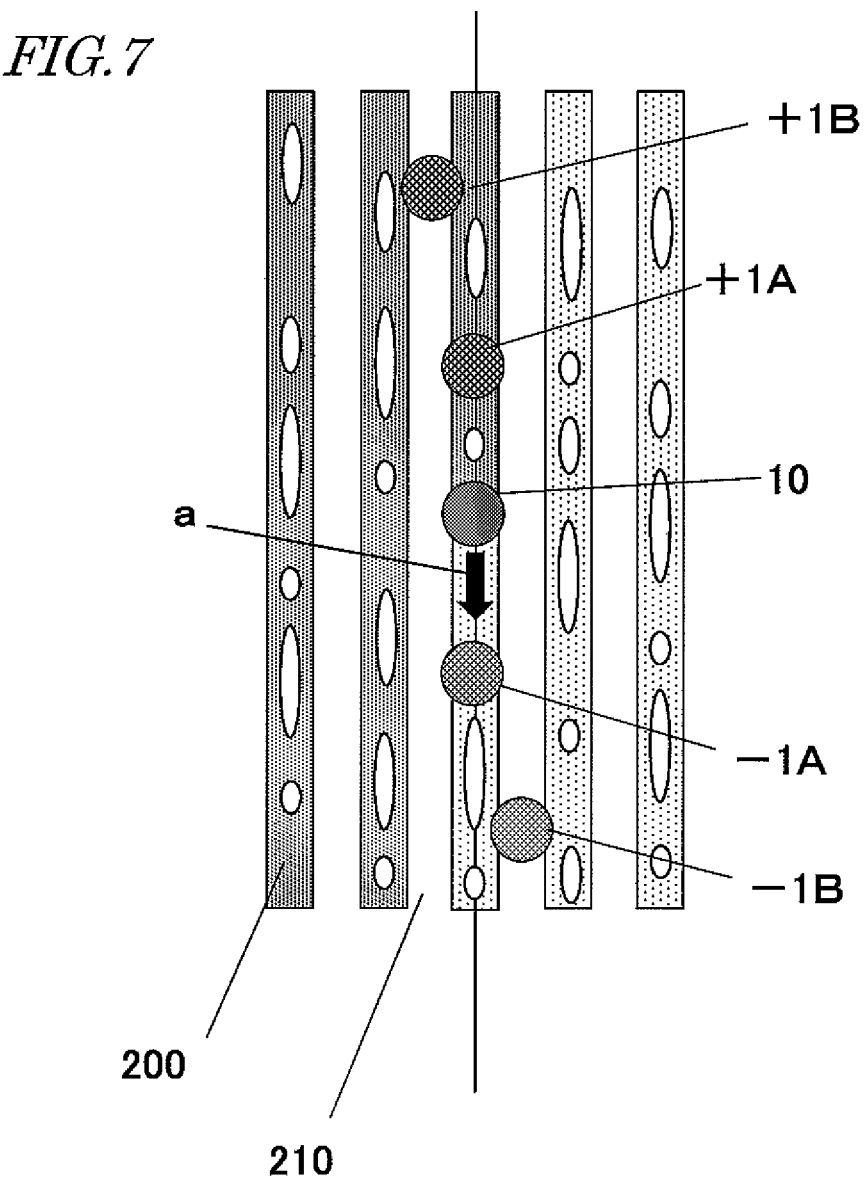
FIG. 7 illustrates the arrangement of light beam spots formed on an optical storage medium according to the first preferred embodiment of the present invention.

FIG. 7 illustrates the arrangement of condensed light beam spots formed by those five condensed light beams on the storage layer of the storage medium 6.

The surface of the storage layer of the storage medium 6 has unevenness. And the condensed light beam spots are formed in the direction indicated by arrow a along a track on which marks are recorded (i.e., along a land 200 that is a raised portion of the uneven surface). Actually, however, the spot is fixed and the storage medium rotates in the direction opposite to the one indicated by the arrow a.

Figure 6:
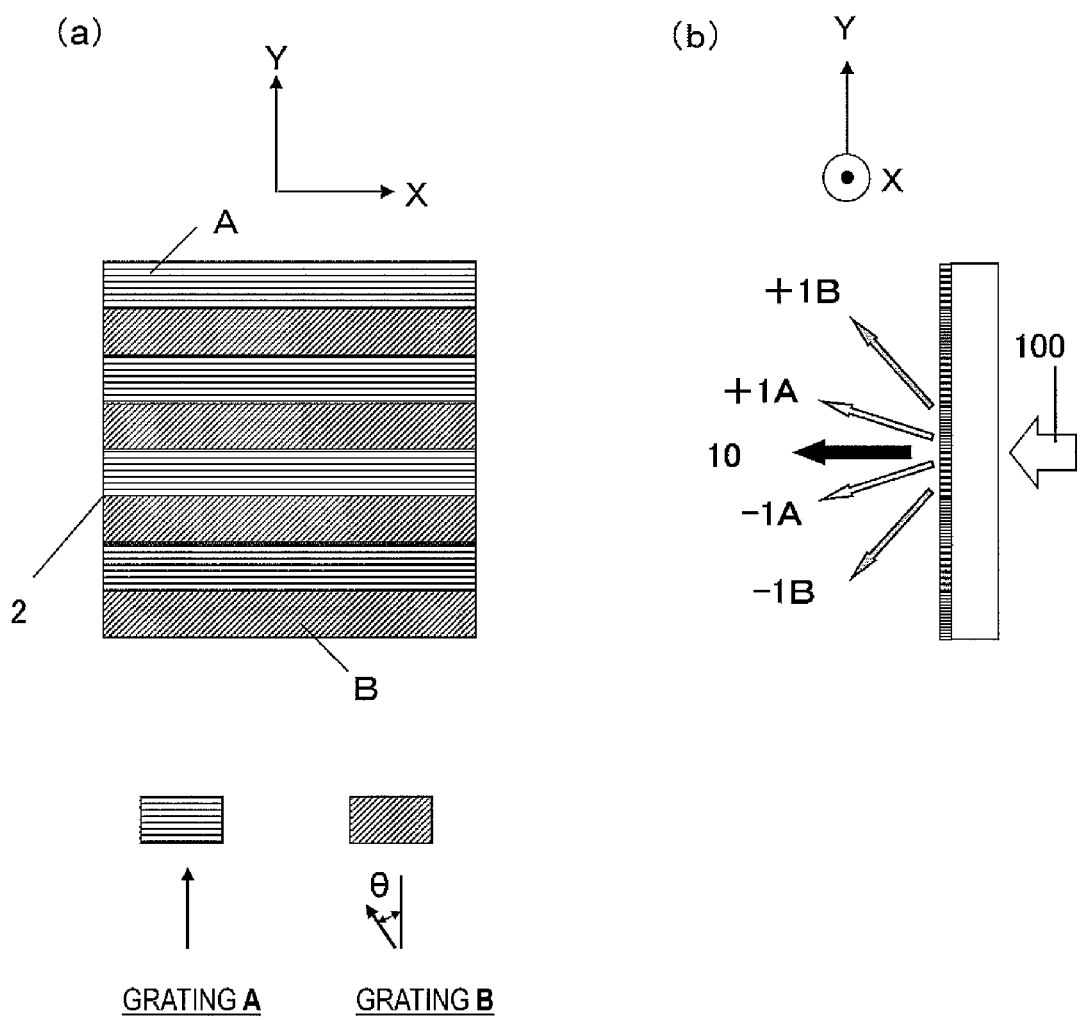
FIGS. 6(a) and 6(b) are respectively a plan view and a side view illustrating a diffractive element according to the first preferred embodiment of the present invention.

Specifically, the main spot 10 is a spot for writing and is a condensed light beam spot of the zero-order light beam that has been transmitted through the diffractive element 2 shown in FIG. 6. The ±first-order light beams that have been diffracted by the grating A of the diffractive element 2 shown in FIG. 6 are condensed on the same track as the main spot 10, thereby forming sub-spots +1A and −1A there. On the other hand, the ±first-order light beams that have been diffracted by the grating B shown in FIG. 6 are condensed between the recording tracks (i.e., on grooves 210 that are depressed portions of the uneven surface), thereby forming sub-spots +1B and −1B there.

It should be noted that on a recording track of the storage medium shown in FIG. 7, marks have already been recorded even where data is going to be written, which means that the old data is going to be overwritten.

Figure 8:
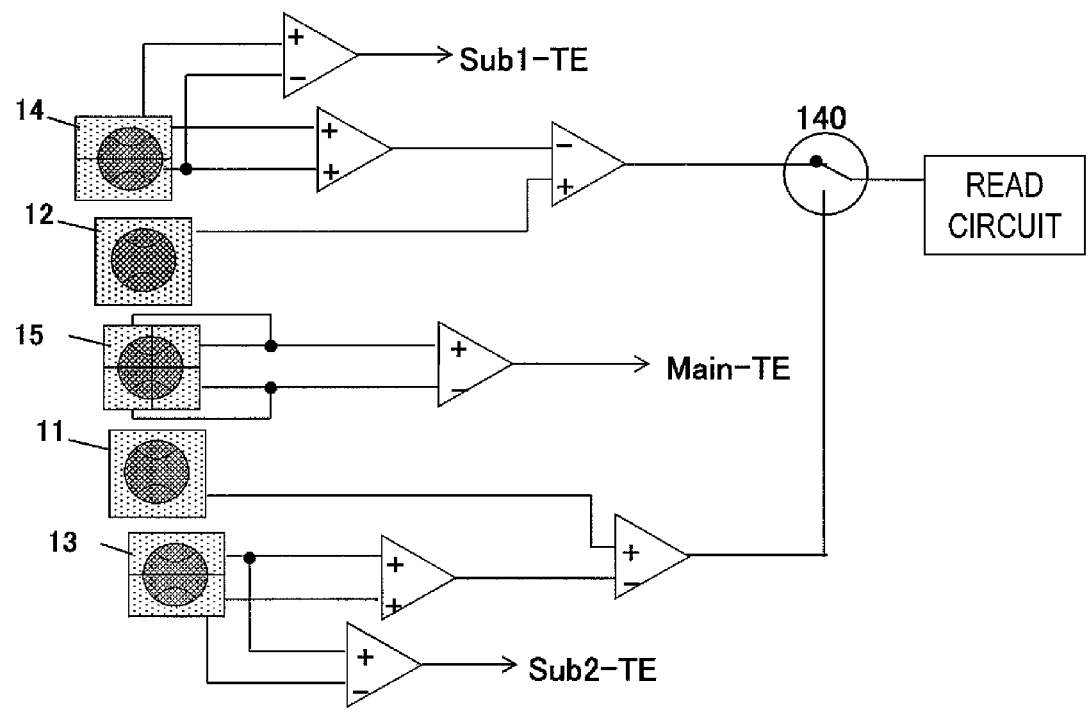
FIG. 8 illustrates an arrangement of photodiodes in a photodetector according to the first preferred embodiment of the present invention.

FIG. 8 illustrates an arrangement of photodiodes in the photodetector 8.

In the photodetector 8 shown in FIG. 8, a quadruple photodetector photoelectric transducer 15 receives the reflected light of the main spot formed by the zero-order light beam and detects a main tracking error signal by the push-pull method. Although not shown in FIG. 8, as the magnitude of the astigmatism given by the detector lens 7 shown in FIG. 5 changes with defocusing, the photoelectric transducer 15 can also detect a focus signal.

On the other hand, photoelectric transducers 11 and 13 receive the reflected light of the sub-spots formed by the −first-order diffracted light beams produced by the gratings A and B, respectively, as shown in FIG. 6.

The light source 1 emits light that has been modulated in order to record a mark on the optical storage medium 6. That is why not just the zero-order light beam that has been emitted from the single light source and diffracted by the diffractive element (i.e., the write beam) but also the ±first-order diffracted light beams that have been diffracted by the gratings A and B of the diffractive element have been subjected to that modulation as well.

The photoelectric transducer 12 that receives the reflected light of the sub-spot that is located on the recording track and to be formed after the recording spot (i.e., the sub-spot +1A in FIG. 7) among the four spots formed by the ±first-order light beams produced by the gratings A and B outputs a signal component in which a reflectance variation produced by a newly recorded mark and a light intensity variation produced by the light modulation are added together. As the sub-spot +1B formed by the ±first-order light beams produced by the grating B scans a portion of the optical storage medium 6 that has no recorded marks between the tracks, the photoelectric transducer 14 that receives the reflected light of the sub-spot +1B outputs a signal representing only the light intensity variation produced by the light modulation by the light source without the reflectance variation produced by any recorded mark.

That is why by calculating the difference between these two sub-beam signals, a read signal (i.e., a monitor signal for use to perform a verify operation) can be obtained. Hereinafter, this respect will be described with reference to FIG. 9.

Portion (a) of FIG. 9 shows the waveform of an optical drive signal. Portion (b) of FIG. 9 schematically illustrates the shapes of marks to be recorded on a track. Each of those marks is recorded at a location where the main spot is formed while the optical drive signal is high.

Portions (c) and (d) of FIG. 9 illustrate the respective waveforms of the reflected light of the sub-spots +1A and +1B, respectively. As can be seen from portion (c) of FIG. 9, as the spot of the light beam that has been modulated by the optical drive signal has shifted on the track where marks are recorded, the waveform of the reflected light of the sub-spot +1A is affected by the recorded marks. On the other hand, as can be seen from portion (d) of FIG. 9, as the spot of the light beam that has been modulated by the optical drive signal has shifted on the track where no marks are recorded, the waveform of the reflected light of the sub-spot +1B is not affected by the recorded marks.

And portion (e) of FIG. 9 illustrates the waveform of a differential signal obtained by subtracting the signal representing the reflected light of the sub-spot +1B from the signal representing the reflected light of the sub-spot +1A. This waveform includes information about the locations and shapes of the recorded marks.

According to this preferred embodiment, even if the direction of scanning the optical storage medium 6 with the light beam spot has been reversed, the optical pickup can also operate in the same way. In that case, the switch 140 shown in FIG. 8 is turned. And a differential signal may be calculated by the photoelectric transducer 11 that receives the reflected light of the sub-spot that is formed after the main spot 10 (i.e., the sub-spot −1A in this case) and the detector 13 that receives the reflected light of the sub-spot −1B formed by the ±first-order diffracted light beams produced by the grating B and then output to a read circuit.

Also, according to this preferred embodiment, a push-pull signal Main-TE is obtained from the photoelectric transducer 15 that receives the reflected light of the main spot that scans the recording track (i.e., a land). Also, two push-pull signals Sub1-TE and Sub2-TE are obtained from the dual photoelectric transducers 14 and 13 that respectively receive the reflected light of the two sub-spots +1B and −1B for scanning the grooves between the tracks. And by performing an arithmetic operation on these push-pull signals, a differential push-pull (DPP) TE signal can be obtained. As a result, a TE signal that causes no offset due to a lens shift, for example, can be obtained.

Furthermore, according to this preferred embodiment, among the grating vectors of the diffractive element shown in FIG. 6, the magnitude of the grating vector of the grating B that leaves a spot between the tracks is smaller than that of the grating vector of the grating A. However, the magnitudes of the grating vectors of these gratings A and B may be in reverse order. In that case, in the photodetector shown in FIG. 8, the photoelectric transducer that receives the light that has come from the grating B is arranged closer to the photoelectric transducer that receives the main beam and the photoelectric transducer that receives the light that has come from the grating A is arranged more distant from the photoelectric transducer that receives the main beam.

Embodiment 2

Next, an optical pickup as a second preferred embodiment of the present invention will be described.

FIGS. 10 and 11 are respectively a plan view and a cross-sectional view illustrating a configuration for two diffractive elements 20 and 21 for use in an optical pickup according to this second preferred embodiment.

As shown in FIG. 10, the grating vectors of the two diffractive elements 20 and 21 have mutually different directions and magnitudes.

The grating vector of the diffractive element 21 agrees with the Y direction. On the other hand, the grating vector of the diffractive element 20 slightly tilts toward the X direction from the Y direction, and has a smaller grating vector (i.e., a smaller grating pitch) than the diffractive element 21.

Since those two elements 20 and 21 are stacked one upon the other as shown in FIG. 11, the light beam 100 that has been emitted from the light source first gets diffracted and split in the Y direction by the diffractive element 21 into the three beams of a zero-order light beam 22 and ±first-order light beams 23 and 24. Among these three diffracted light beams, the zero-order light beam 22 that has been transmitted through the element 21 further gets diffracted and split by the other element 20 into a zero-order light beam 25 and ±first-order light beams 26 and 27. On the other hand, the +first-order light beam 23 that has been diffracted by the element 21 is transmitted through the element 20 and becomes a zero-order light beam 28. And the −first-order light beam 24 that has been diffracted by the element 21 is transmitted through the element 20 and becomes another zero-order light beam 29. Using these five beams thus produced, a write operation and a read operation for verification purposes are carried out. Other diffracted light beams are also produced but will not be used.

FIG. 12 illustrates the arrangement of condensed light beam spots formed by those five condensed light beams on the storage layer of the storage medium 6.

Specifically, the main spot 10 is a spot for writing and is a condensed light beam spot of the zero-order light beam 25 that has been transmitted through the diffractive elements 20 and 21 shown in FIG. 11. The light beams 28 and 29 that have been diffracted by the diffractive element 21 shown in FIG. 11 and transmitted through the diffractive element 20 are condensed on the same track as the main spot 10, thereby forming sub-spots +1A and −1A there. On the other hand, the light beams 26 and 27 that have been produced from the zero-order light beam diffracted by the diffractive element 21 and then by the diffractive element 20 as shown in FIG. 11 are condensed between the recording tracks (i.e., on grooves that are depressed portions of the uneven surface), thereby forming sub-spots +1B and −1B there.

According to this preferred embodiment, by getting the reflected light of these five light beam spots received by the photodetector 8 as in the first preferred embodiment described above, a read signal for verification purposes, from which an optically modulated component has been canceled, can also be obtained.

Although the diffractive elements 21 and 20 with mutually different grating vector directions are supposed to be stacked one upon the other so as to receive the incoming light in this order in the preferred embodiment described above, those diffractive elements 21 and 20 may also be stacked in reverse order. Also, even though the diffractive elements have been regarded as two separate elements in the preferred embodiment described above, those diffractive elements may also be provided on the top and bottom surfaces of a single substrate as well.

Embodiment 3

Next, an optical pickup as a third preferred embodiment of the present invention will be described.

FIG. 13(a) is a plan view illustrating a configuration for a diffractive element 30 for use in the optical pickup of this preferred embodiment. The diffractive element 30 of this preferred embodiment is divided into multiple slips in the Y direction, i.e., in the tangential direction, so that two different gratings A2 and B2 are arranged alternately in the diffractive element 30.

The grating vector of the grating A2 agrees with the Y direction and is uniform in the grating. On the other hand, the grating vector of the grating B2 has a distribution of directions. And the light that has been diffracted by the grating B is given an aberration. A zero-order light beam, however, is not given an aberration due to the distribution of grating vectors even when transmitted through the grating B2.

FIG. 13(b) is a cross-sectional view of the diffractive element 30. As the diffractive element 30 has two different gratings A2 and B2, the light that has been incident on the diffractive element 30 gets diffracted and split into five beams in total, namely, ±first-order diffracted light beams produced by the grating A2, ±first-order diffracted light beams produced by the grating B2, and a zero-order light beam produced by the gratings A2 and B2. Among these diffracted light beams, the zero-order light beam has higher diffraction efficiency than any other light beam.

FIG. 14 is a cross-sectional view illustrating how the light that has been diffracted by the diffractive element 30 is condensed by the objective lens 5 onto the optical storage medium 6. As shown in FIG. 14, the zero-order light beam that has been transmitted through the element 30 is condensed right on the storage layer of the optical storage medium 6 as represented by the light ray 33, thereby achieving good spot quality. Likewise, the ±first-order light beams that have been diffracted by the grating A2 of the element 30 are affected by coma aberration due to the tilt of their optical axis but are also condensed right on the storage layer of the optical storage medium 6 as represented by the light ray 33, thereby achieving good spot quality, too. On the other hand, the light that has been diffracted by the grating B2 with the distribution of grating vectors comes to have an aberration such as a spherical aberration or astigmatism due to the distribution of grating vectors, and therefore, is condensed either before or beyond the storage layer of the optical storage medium as represented by the light ray 31 or 32. As a result, a somewhat broadened condensed light beam spot is formed on the surface of the optical storage medium in that case.

FIG. 15 illustrates the arrangement of condensed light beam spots formed by those five condensed light beams on the storage layer of the storage medium 6.

Figure 13:
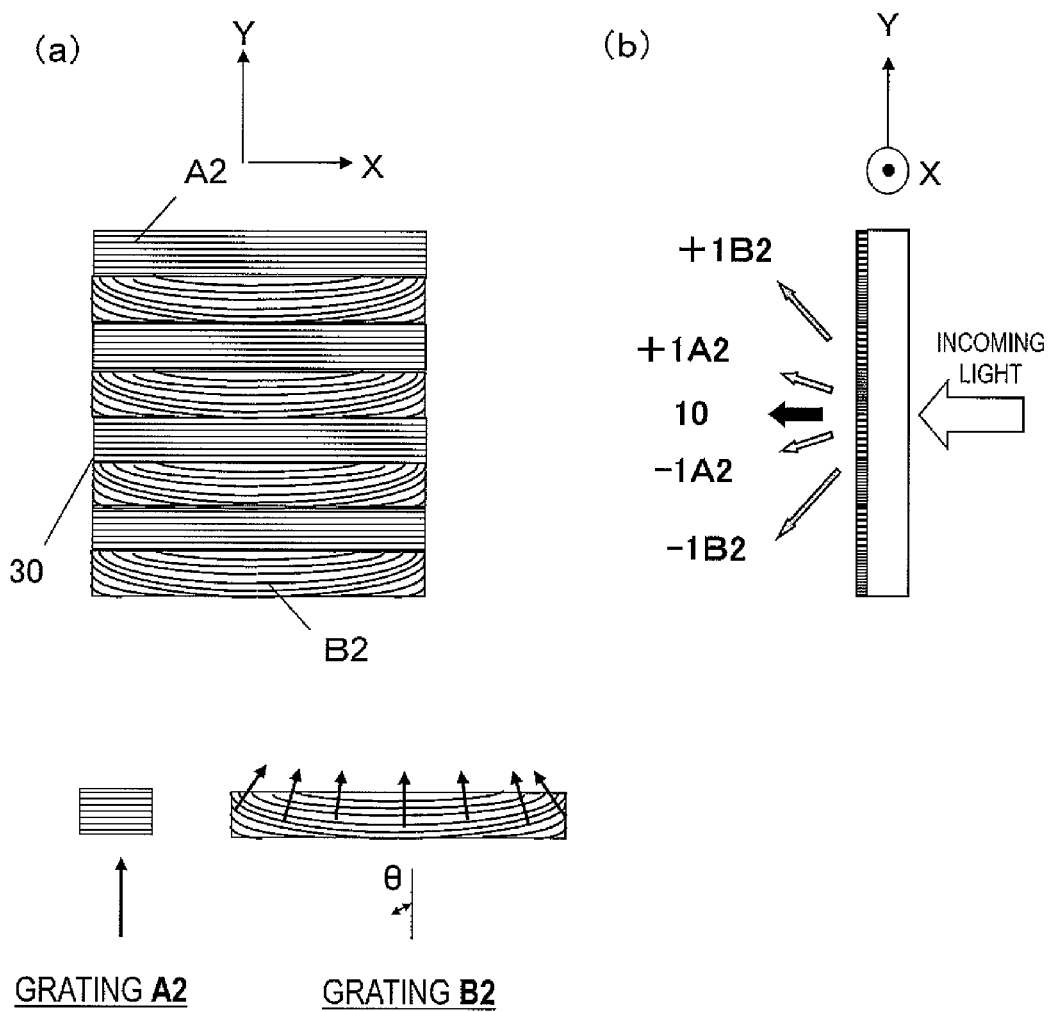

Specifically, the main spot 10 is a spot for writing and is a condensed light beam spot of the zero-order light beam that has been transmitted through the diffractive element 30 shown in FIG. 13. The ±first-order diffracted light beams that have been diffracted by the grating A2 of the diffractive element 30 shown in FIG. 13 are condensed on the same track as the main spot 10, thereby forming sub-spots +1A2 and −1A2 there. On the other hand, the ±first-order diffracted light beams that have been diffracted by the grating B2 of the diffractive element 30 shown in FIG. 13 have been broadened to extend to the both sides of the track_on the surface of the optical storage medium as described above, thereby forming sub-spots +1B2 and −1B2 there.

The means for receiving and detecting the reflected light of these light beams may be the same as what is illustrated in FIG. 8 for the first preferred embodiment.

As the sub-spots +1B2 and −1B2 have not been condensed sufficiently, their resolutions are low for the sizes of the recorded marks, and the reflectance variation component of a mark that has been recorded on the storage layer is not included as their signal component. As a result, the signals generated will represent only the optically modulated component of the light source. Consequently, just like the sub-spots +1A and −1A that have already been described with reference to FIG. 8 for the first preferred embodiment, that component can also be canceled.

Although the first, second and third preferred embodiments of the present invention described above are implemented as an optical pickup, an optical pickup according to any of those preferred embodiments of the present invention is also applicable for use in a drive that reads and writes data from/on a single optical storage medium using multiple optical pickups. Specifically, the optical pickup may be used to write data accurately on either multiple different areas of the same optical storage medium or multiple different optical storage media in a data file system that uses an optical tape or an optical disc.

Next, a preferred embodiment of an optical read/write drive according to the present invention will be described with reference to FIG. 16. In the example illustrated in FIG. 16, the optical read/write drive is implemented as an optical disc drive. However, the optical read/write drive of the present invention does not have to be an optical disc drive but may also be an optical tape drive as well.

The optical disc drive illustrated in FIG. 16 includes an optical pickup 1300, a disc motor 1302 to rotate an optical disc 1200, and circuit sections that perform various kinds of signal processing.

In the exemplary configuration shown in FIG. 16, the output of the optical pickup 1300 is supplied to an encoder/decoder 1308 by way of a frontend signal processing section 1306. In reading data, the encoder/decoder 1308 decodes the data that is stored on the optical disc 1200 based on the signal that has been generated by the optical pickup 1300. In writing data, on the other hand, the encoder/decoder 1308 encodes the data to generate a signal to be written on the optical disc 1200 and outputs the signal to the optical pickup 1300.

The frontend signal processing section 1306 generates a read signal, a focus error signal FE and a tracking error signal TE based on the output of the optical pickup 1300. The focus error signal FE and the tracking error signal TE are then supplied to a servo control section 1310. In response, the servo control section 1310 gets the disc motor 1302 controlled by a driver amplifier 1304. The servo control section 1310 also gets the position of an objective lens controlled by an actuator in the optical pickup 1300. The encoder/decoder 1308, the servo control section 1310 and all the other components are controlled by a CPU 1309.

A major difference between an optical tape drive and an optical disc drive lies in a mechanism for driving the optical storage medium. If an optical tape is used as the optical storage medium, multiple rollers are used to make the optical tape run. Also, by using multiple optical pickups, the optical tape drive can read or write data from/on a plurality of tracks of the optical tape at the same time.

The present invention is extensively applicable for use in any storage device that adopts the DRAW technique in order to perform a write operation and a read operation for verification purposes at the same time.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2011-188430 filed on Aug. 31, 2011 the entire contents of which are hereby incorporated by reference.

What is claimed is:

1. An optical pickup for writing and reading data on an optical storage medium that has a land and a groove, the optical pickup comprising:
    a laser light source for emitting a light beam;
    a diffractive element for diffracting the light beam to split the light beam into multiple diffracted light beams, the multiple diffracted light beams including a zero-order diffracted light beam for writing data on a track of the land or the groove of the optical storage medium and non-zero-order diffracted light beams for reading the data from the track, the diffractive element comprising first and second diffraction gratings that have mutually different grating vector directions and pitches;
    a lens for condensing the diffracted light beams onto the optical storage medium; and
    a photodetector configured to receive at least part of the diffracted light beams reflected from the optical storage medium,
    wherein the first diffraction grating is arranged to form light beam spots on the same track by the non-zero-order and zero-order diffracted light beams,
    the second diffraction grating is arranged to form a light beam spot so as to extend to both sides of said track, or arranged to form a light beam spot on one side of said track, by the non-zero-order diffracted light beams,
    the photodetector is configured to receive reflected light of the light beam spots formed by the diffracted light beam from the first diffraction grating, and configured to receive reflected light of the light beam spot formed by the non-zero-order diffracted light beam from the second diffraction grating so as to read data that has been written on said track, and
    the diffractive element is arranged so that the light beam spot formed by the non-zero-order diffracted light beam that is produced by the second diffraction grating has a broader width than the light beam spot formed by the non-zero-order diffracted light beam that is produced by the first diffraction grating.

2. The optical pickup of claim 1, wherein the diffractive element is arranged so that two light beam spots are formed on mutually different tracks by the two non-zero-order diffracted light beams that are produced by the first and second diffraction gratings, respectively.

3. The optical pickup of claim 1, wherein the first diffraction grating of the diffractive element splits the incoming light beam into the zero-order diffracted light beam and ±first-order diffracted light beams,
    the second diffraction grating of the diffractive element splits the incoming light beam into the zero-order diffracted light beam and ±first-order diffracted light beams, and
    the ±first-order diffracted light beams produced by the second diffraction grating have different diffraction directions from the ±first-order diffracted light beams produced by the first diffraction grating.

4. The optical pickup of claim 1, wherein the photodetector is arranged so as to receive reflected light of the light beam spots formed by the zero-order and ±first-order diffracted light beams that are produced by the first diffraction grating and reflected light of the light beam spots formed by the ±first-order diffracted light beams that are produced by the second diffraction grating.

5. The optical pickup of claim 4, wherein the photodetector is configured to output a differential signal representing the difference between the intensity of the reflected light of the light beam spot formed by the +first-order or −first-order diffracted light beam that is produced by the first diffraction grating and the intensity of the reflected light of the light beam spot formed by the +first-order or −first-order diffracted light beam that is produced by the second diffraction grating.

6. A diffractive element that diffracts an incoming light beam and splits the light beam into multiple diffracted light beams including a zero-order diffracted light beam for writing data on a track of a land or a groove of an optical storage medium, and non-zero-order diffracted light beams for reading the data from the track, the diffractive element comprising:
   first and second diffraction gratings that have mutually different grating vector directions and pitches;
   wherein:
   the first diffraction grating is arranged to form light beam spots on the same track by the non-zero-order and zero-order diffracted light beams,
   the second diffraction grating is arranged to form a light beam spot so as to extend to both sides of said track, or arranged to form a light beam spot on one side of said track, by the non-zero-order diffracted light beams, and
   the diffractive element is arranged so that the light beam spot formed by the non-zero-order diffracted light beam that is produced by the second diffraction grating has a broader width than the light beam spot formed by the non-zero-order diffracted light beam that is produced by the first diffraction grating.

7. The diffractive element of claim 6, wherein the first and second diffraction gratings have been divided into a number of portions that are alternately distributed at multiple locations on the same plane.

8. The diffractive element of claim 7, wherein the first and second diffraction gratings have been divided into a number of portions that are arranged in slips or in a checkerboard pattern.

9. The diffractive element of claim 6, wherein the first and second diffraction gratings are stacked one upon the other.

10. An optical read/write drive comprising:
    at least one optical pickup as defined by claim 1;
    an optical modulator which modulates the intensity of the light beam so that a mark is recorded on the track by the zero-order diffracted light beam when data is going to be written on the track on the optical storage medium; and
    a signal processing unit configured to read the mark that has been recorded on the track based on the output of the optical pickup while writing data on the track on the optical storage medium,
    wherein the signal processing unit configured to generate a read signal based on a differential signal representing the difference between the intensity of the reflected light of the light beam spot formed by the +first-order or −first-order diffracted light beam that has been produced by the first diffraction grating and the intensity of the reflected light of the light beam spot formed by the +first-order or −first-order diffracted light beam that has been produced by the second diffraction grating.

11. The optical read/write drive of claim 10, wherein the optical modulator is built in the optical pickup.

12. The optical read/write drive of claim 10, wherein the at least one optical pickup includes two or more optical pickups, and
    wherein those optical pickups write data on multiple different tracks on the optical storage medium at the same time.

* * * * *